United States Patent
Ahn et al.

(10) Patent No.: US 11,159,347 B2
(45) Date of Patent: Oct. 26, 2021

(54) METHOD FOR TRANSMITTING AND RECEIVING SIGNAL BY MEANS OF BEAM IN WIRELESS COMMUNICATION SYSTEM, AND APPARATUS FOR SAID METHOD

(71) Applicant: LG ELECTRONICS INC., Seoul (KR)

(72) Inventors: Minki Ahn, Seoul (KR); Kijun Kim, Seoul (KR); Jonghyun Park, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/610,490

(22) PCT Filed: May 3, 2018

(86) PCT No.: PCT/KR2018/005137
§ 371 (c)(1),
(2) Date: Nov. 1, 2019

(87) PCT Pub. No.: WO2018/203680
PCT Pub. Date: Nov. 8, 2018

(65) Prior Publication Data
US 2020/0162289 A1  May 21, 2020

Related U.S. Application Data

(60) Provisional application No. 62/501,703, filed on May 4, 2017.

(51) Int. Cl.
*H04L 25/02* (2006.01)
*H04L 5/00* (2006.01)
(Continued)

(52) U.S. Cl.
CPC .......... *H04L 25/0224* (2013.01); *H04L 5/001* (2013.01); *H04L 5/0048* (2013.01);
(Continued)

(58) Field of Classification Search
None
See application file for complete search history.

(56) References Cited

U.S. PATENT DOCUMENTS

2008/0080472 A1* 4/2008 Bertrand ............... H04J 11/005
370/344
2012/0063302 A1* 3/2012 Damnjanovic ... H04W 74/0833
370/228

(Continued)

FOREIGN PATENT DOCUMENTS

EP  3528559    8/2019
WO 2011142608  11/2011

OTHER PUBLICATIONS

PCT International Application No. PCT/KR2018/005137, International Search Report dated Aug. 29, 2018, 3 pages.
(Continued)

*Primary Examiner* — Ayanah S George
(74) *Attorney, Agent, or Firm* — Lee, Hong, Degerman, Kang & Waimey

(57) ABSTRACT

The present specification provides a method for transmitting and receiving a signal by means of a beam in a wireless communication system. The method for a terminal for transmitting and receiving a signal by means of one or more beams according to the present specification may comprise the steps of: receiving sounding reference signal (SRS) resource configuration information for an SRS transmission from a base station, the SRS resource configuration information comprising configuration information indicating one or more previously configured timing advance values for one or more SRS resources; receiving, from the base station,
(Continued)

control information indicating a particular SRS resource from among the one or more SRS resources; and transmitting an uplink signal at the configured temporal uplink transmission point using the timing advance value corresponding to the particular SRS resource.

13 Claims, 12 Drawing Sheets

(51) Int. Cl.
*H04W 16/28* (2009.01)
*H04W 72/04* (2009.01)
*H04W 72/14* (2009.01)

(52) U.S. Cl.
CPC ......... *H04L 5/0053* (2013.01); *H04W 16/28* (2013.01); *H04W 72/0413* (2013.01); *H04W 72/0446* (2013.01); *H04W 72/14* (2013.01)

(56) References Cited

U.S. PATENT DOCUMENTS

| | | | |
|---|---|---|---|
| 2013/0294387 A1* | 11/2013 | Tanaka | H04W 56/0045 370/329 |
| 2014/0016620 A1* | 1/2014 | Singh | H04L 5/0078 370/336 |
| 2015/0016428 A1 | 1/2015 | Narasimha et al. | |
| 2015/0023191 A1* | 1/2015 | Kim | H04W 48/16 370/252 |

OTHER PUBLICATIONS

ZTE, ZTE Microelectronics, "Discussion on SRS design for NR," 3GPP TSG-RAN WG1 #88bis, R1-1704414, Apr. 2017, 5 pages.
Intel Corporation, "On TimingAdvance for Multi-beam operation," 3GPP TSG-RAN WG1 #88bis, R1-1704726, Apr. 2017, 4 pages.
European Patent Office Application Serial No. 18795085.2, Search Report dated Nov. 20, 2020, 10 pages.

* cited by examiner (a)

(b)

(a)

(b)

METHOD FOR TRANSMITTING AND RECEIVING SIGNAL BY MEANS OF BEAM IN WIRELESS COMMUNICATION SYSTEM, AND APPARATUS FOR SAID METHOD

CROSS-REFERENCE TO RELATED APPLICATIONS

This application is the National Stage filing under 35 U.S.C. 371 of International Application No. PCT/KR2018/005137, filed on May 3, 2018, which claims the benefit of U.S. Provisional Application No. 62/501,703, filed on May 4, 2017, the contents of which are all hereby incorporated by reference herein in their entirety.

TECHNICAL FIELD

The present disclosure relates to a wireless communication system and, more particularly, to a method for configuring a timing advance in relation to the transmission and reception of signals using a beam and an apparatus supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

This specification proposes a method of configuring a plurality of timing advance processes (TA processes) by considering a plurality of beam pairs and an apparatus therefor.

In relation to this, this specification proposes a method of configuring and/or indicating a plurality of TA processes based on a reference RS(s) if a plurality of TA processes is necessary in the transmission and reception of signals between a UE and eNBs.

Furthermore, this specification proposes a method of configuring and/or indicating a plurality of TA processes based on the resource(s) of a sounding reference signal (SRS) if a plurality of TA processes is necessary in the transmission and reception of signals between a UE and eNBs and an apparatus therefor.

Technical objects of the present invention are not limited to the above-described technical objects, and other technical objects not described above may be evidently understood by those skilled in the art to which the present invention pertains from the following description.

Technical Solution

In a method of transmitting and receiving, by a user equipment, a signal through one or more beams in a wireless communication system according to an embodiment of the present disclosure, the method includes receiving, from a base station, sounding reference signal (SRS) resource configuration information for the transmission of an SRS, wherein the SRS resource configuration information includes configuration information indicating at least one preset timing advance value for one or more SRS resources, receiving, from the base station, control information indicating a specific SRS resource of the one or more SRS resources, and transmitting an uplink signal at an uplink transmission timing configured using a timing advance value corresponding to the specific SRS resource.

Furthermore, in the method according to an embodiment of the present disclosure, the SRS resource configuration information may include one or more identifiers indicating the one or more SRS resources, and the at least one preset timing advance value may be set using the one or more identifiers.

Furthermore, in the method according to an embodiment of the present disclosure, if the one or more SRS resources are grouped into a plurality of SRS resource groups, the timing advance value may be differently set for each SRS resource group.

Furthermore, in the method according to an embodiment of the present disclosure, if beams of the one or more SRS resources are grouped into a plurality of beam groups, the timing advance value may be differently set for each beam group.

Furthermore, in the method according to an embodiment of the present disclosure, if cells of the one or more SRS resources are grouped into a plurality of cell groups, the timing advance value may be differently set for each cell group.

Furthermore, in the method according to an embodiment of the present disclosure, the uplink signal may be a physical uplink shared channel (PUSCH).

Furthermore, in the method according to an embodiment of the present disclosure, the control information may be received through the SRS resource indicator field of an uplink grant.

Furthermore, in the method according to an embodiment of the present disclosure, the SRS resource configuration information may further include configuration information indicating at least one virtual cell identifier or power control pre-configured for the one or more SRS resources.

Furthermore, the method according to an embodiment of the present disclosure may further include transmitting the uplink signal at an uplink transmission timing configured using a maximum value of timing advance values corresponding to the plurality of SRS resources if the user equipment receives, from the base station, control information indicating a plurality of SRS resources of the one or more SRS resources.

Furthermore, the method according to an embodiment of the present disclosure may further include transmitting the uplink signal at an uplink transmission timing configured using an average value of timing advance values corresponding to the plurality of SRS resources if the user equipment receives, from the base station, control information indicating a plurality of SRS resources of the one or more SRS resources.

Furthermore, in the method according to an embodiment of the present disclosure, the SRS resource configuration information may be received through higher layer signaling.

Furthermore, in the method according to an embodiment of the present disclosure, transmitting the uplink signal at the uplink transmission timing configured using the timing advance value corresponding to the specific SRS resource may include receiving, from the base station, configuration information indicating one or more preset timing advance values for one or more reference signals, receiving, from the base station, a specific reference signal of the one or more reference signals, and transmitting the uplink signal at an uplink transmission timing configured using a first timing advance value corresponding to the specific SRS resource and a second timing advance value corresponding to the specific reference signal.

Furthermore, in the method according to an embodiment of the present disclosure, the one or more reference signals may include at least one of a synchronization signal block or a channel state information-reference signal (CSI-RS).

Furthermore, in a user equipment transmitting and receiving a signal through one or more beams in a wireless communication system according to an embodiment of the present disclosure, the user equipment includes a radio frequency (RF) module for transmitting and receiving a radio signal and a processor functionally coupled to the RF module. The processor may be configured to receive, from a base station, sounding reference signal (SRS) resource configuration information for the transmission of an SRS, the SRS resource configuration information may include configuration information indicating at least one preset timing advance value for one or more SRS resources, receive, from the base station, control information indicating a specific SRS resource of the one or more SRS resources, and transmit an uplink signal at an uplink transmission timing configured using a timing advance value corresponding to the specific SRS resource.

Furthermore, in the UE according to an embodiment of the present disclosure, the SRS resource configuration information may include one or more identifiers indicating the one or more SRS resources, and the at least one preset timing advance value may be set using the one or more identifiers.

Advantageous Effects

According to an embodiment of the present disclosure, there is an effect in that a UE can apply the best timing advance (TA) value suitable for each beam pair although it transmits and receives signal to and from eNBs using a plurality of beam pairs.

Furthermore, according to an embodiment of the present disclosure, there is an effect in that a TA configuration can be efficiently performed using the resource of a sounding reference signal without a separate signaling procedure for the TA configuration.

Furthermore, according to an embodiment of the present disclosure, there is an effect in that overhead that may occur with respect to a TA configuration can be prevented because the TA configuration is hierarchically performed.

Advantages which may be obtained in the present disclosure are not limited to the aforementioned effects and other unmentioned advantages will be clearly understood by those skilled in the art from the following description.

DESCRIPTION OF DRAWINGS

The accompanying drawings, which are included herein as a part of a description in order to help understanding of the present disclosure, provide embodiments of the present disclosure, and describe the technical features of the present disclosure with the description below.

MODE FOR INVENTION

Figure 1:
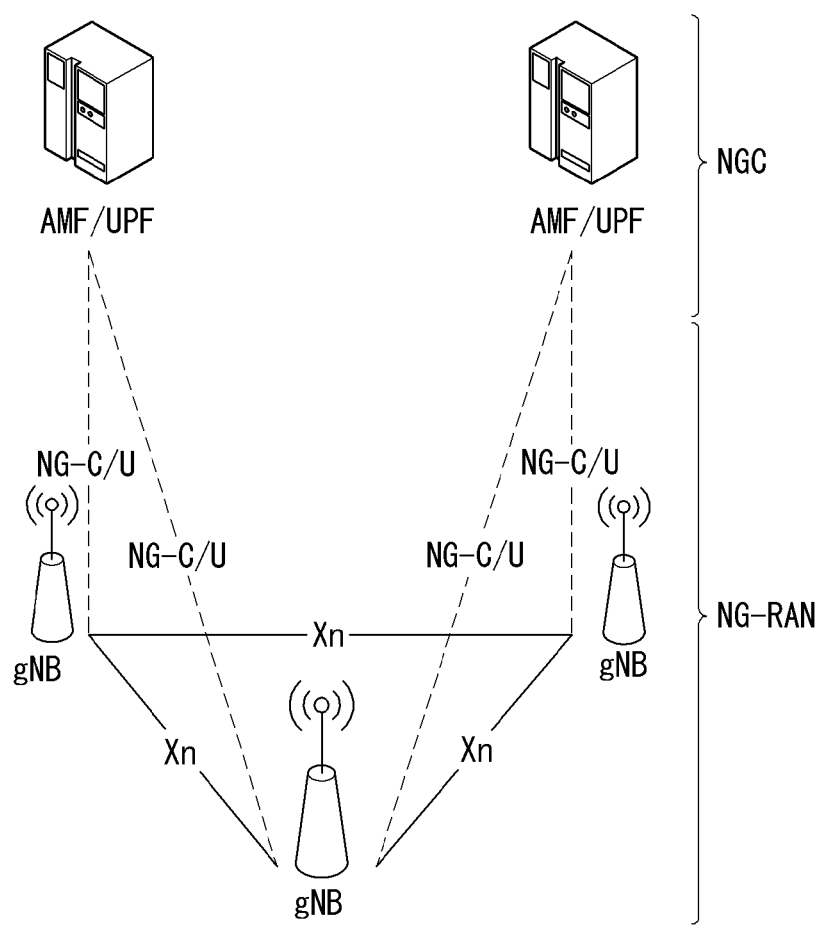
FIG. 1 is a diagram showing an example of a general system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an evolved-NodeB (eNB), a base transceiver system (BTS), or an access point (AP). Furthermore, the terminal may be fixed or may have mobility and may be substituted with another term, such as a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to a UE, and uplink (UL) means communication from a UE to a base station. In the DL, a transmitter may be part of a base station, and a receiver may be part of a UE. In the UL, a transmitter may be part of a UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: eLTE eNB is the evolution of an eNB which supports a connection to EPC and NGC.

gNB: A node which supports not only a connection to NGC but also NR.

New RAN: A wireless access network which supports NR or E-UTRA or interacts with NGC.

Network slice: A network slice is a network defined by an operator to provide a solution optimized to a specific market scenario requiring specific requirements together with an end-to-end scope.

Network function: A network function is a logical node within network infrastructure having a well-defined external interface and a well-defined functional operation.

NG-C: A control plane interface used for an NG2 reference point between a new RAN and NGC.

NG-U: A user plane interface used for an NG3 reference point between a new RAN and NGC.

Non-standalone NR: A disposition configuration by which a gNB requires an LTE eNB as an anchor to establish a control plane connection to an EPC or by which a gNB requires an eLTE eNB as an anchor to establish a control plane connection to an NGC.

Non-standalone E-UTRA: A disposition configuration which requires a gNB as an anchor to establish a control plane connection to an NGC.

User plane gateway: An end-point of the NG-U interface.

System in General

FIG. 1 illustrates one example of the overall system structure of an NR to which a method proposed by the present specification may be applied.

Referring to FIG. 1, an NG-RAN is composed of an NG-RA user plane (a new AS sublayer/PDCP/RLC/MAC/PHY) and gNBs providing control plane (RRC) protocol endpoints for User Equipment (UE).

The gNBs are inter-connected through an Xn interface.

The gNBs are also connected to the NGC through the NG interface.

More specifically, the gNBs are connected to Access and Mobility Management Functions (AMFs) through the N2 interface and to User Plane Functions (UPFs) through the N3 interface.

New Rat (NR) Numerology and Frame Structure

In the NR system, a plurality of numerologies may be supported. In this case, the numerology may be defined by a subcarrier spacing and cyclic prefix (CP) overhead. In this case, a plurality of the subcarrier spacing may be derived by scaling a basic subcarrier spacing in integer N (or μ). Furthermore, although it is assumed that a very low subcarrier spacing is not used in a very high carrier frequency, a numerology used may be selected independently of a frequency band.

Furthermore, in the NR system, various frame structures according to a plurality of numerologies may be supported.

Hereinafter, orthogonal frequency division multiplexing (OFDM) numerologies and frame structures which may be taken into consideration in the NR system are described.

A plurality of OFDM numerologies supported in the NR system may be defined as in Table 1.

TABLE 1

| μ | $\Delta f = 2^\mu \cdot$ 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

In relation to a frame structure of the NR system, the size of various fields in a time domain is represented as a multiple of a time unit of $T_s=1/(\Delta f_{max} \cdot N_f)$. In this case, $\Delta f_{max}=480 \cdot 10^3$ and $N_f=4096$. Downlink and uplink transmission are configured with a radio frame having a period of $T_f=(\Delta f_{max}N_f/100) \cdot T_s=10$ ms. In this case, the radio frame is configured with 10 subframes having a period of each $T_{sf}=(\Delta f_{max}N_f/1000) \cdot T_s=1$ ms. In this case, there may be one set of frames for the uplink and one set of frames for the downlink.

Figure 2:
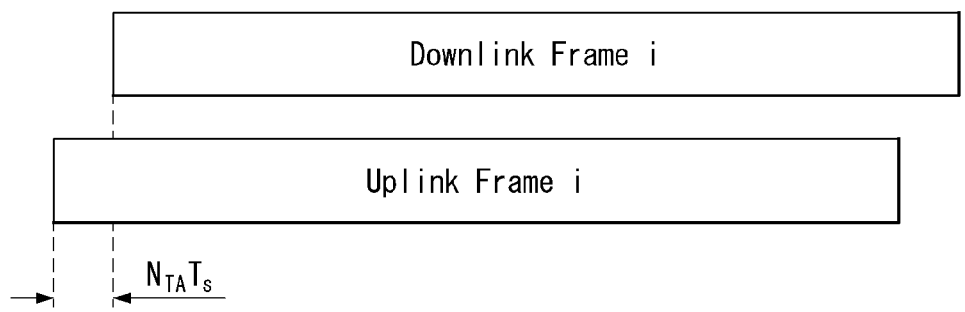
FIG. 2 shows the relation between an uplink frame and a downlink frame in a wireless communication system to which a method proposed in this specification may be applied.

FIG. 2 shows the relation between an uplink frame and a downlink frame in a wireless communication system to which a method proposed in this specification may be applied.

As shown in FIG. 2, the transmission of an uplink frame number i from a user equipment (UE) needs to be started prior to $T_{TA}=N_{TA}T_s$ compared to the start of a corresponding downlink frame in the corresponding UE.

With respect to a numerology μ, slots are numbered in order of higher $n_s^\mu \in \{0, \ldots, N_{subframe}^{slots, \mu}-1\}$ within a subframe, and the slots are numbered in order of higher $n_{s,f}^\mu \in \{0, \ldots, N_{frame}^{slots,\mu}-1\}$ within a radio frame. One slot is configured with contiguous $N_{symb}^\mu$ OFDM symbols, and $N_{symb}^\mu$ is determined based on a used numerology and slot configuration. The start of a slot $n_s^\mu$ within the subframe is temporally aligned with the start of an OFDM symbol $n_s^\mu N_{symb}^\mu$ in the same subframe.

All UEs cannot perform transmission and reception at the same time, and this means that all the OFDM symbols of a downlink slot or an uplink slot cannot be used.

Table 2 shows the number of OFDM symbols per slot for a normal CP in a numerology μ, and Table 3 shows the number of OFDM symbols per slot for an extended CP in the numerology μ.

TABLE 2

| | | Slot configuration | | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
|---|---|---|---|---|---|---|
| | | 0 | | | 1 | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

In relation to a physical resource of an NR system, an antenna port, a resource grid, a resource element, a resource block, a carrier part, etc. may be taken into consideration.

Hereinafter, physical resources which may be taken into consideration in the NR system are described specifically.

First, in relation to the antenna port, the antenna port is defined so that a channel on which a symbol on the antenna port is carried is deduced from a channel on which a different symbol on the same antenna port is carried. If the large-scale property of a channel on which a symbol on one antenna port is carried can be deduced from a channel on which a symbol on a different antenna port is carried, the two antenna ports may be said to have a quasi co-located or quasi co-location (QC/QCL) relation. In this case, the large-scale property includes one or more delay spread, Doppler spread, a frequency shift, average received power, or received timing.

Figure 3:
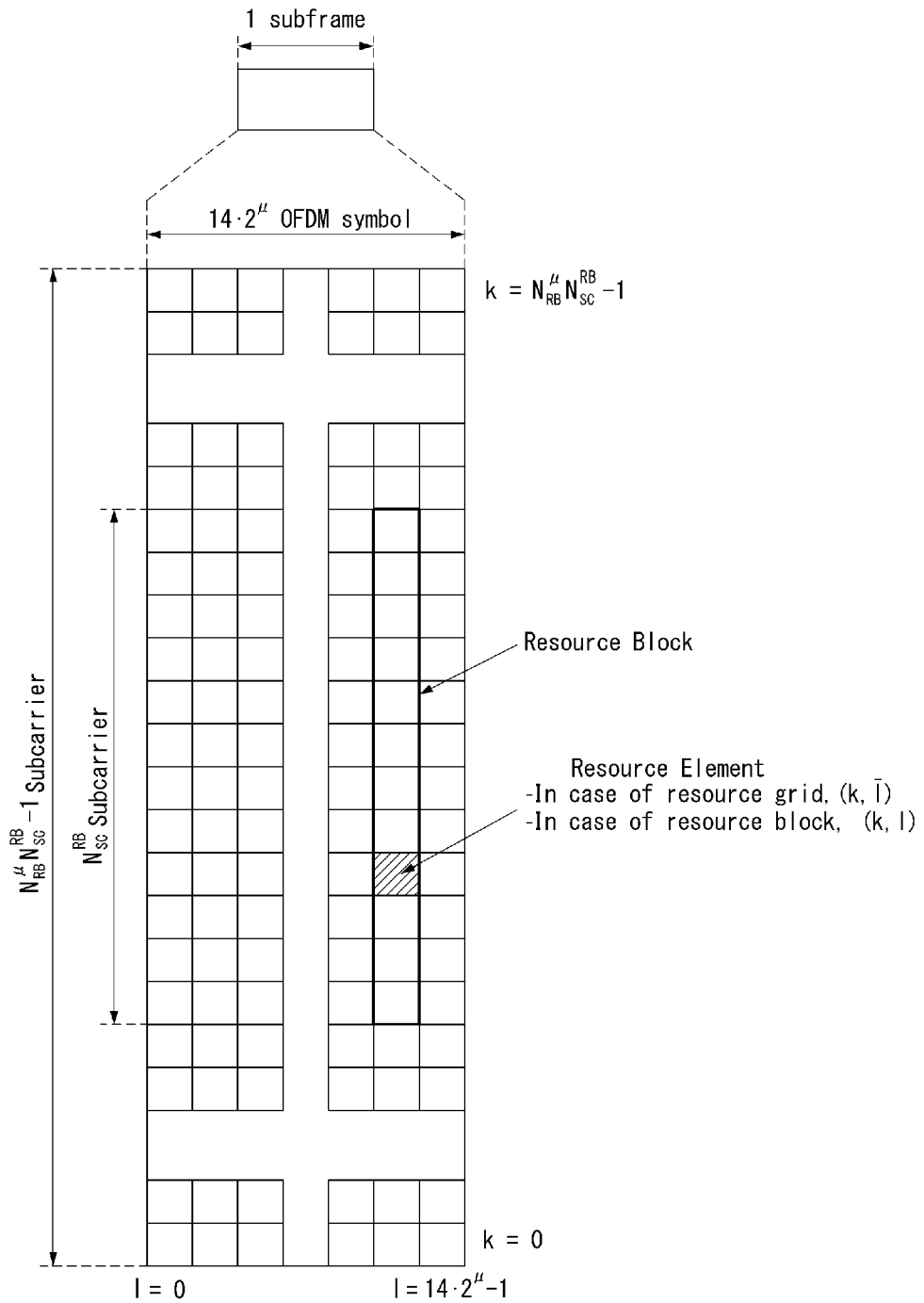
FIG. 3 shows an example of a resource grid supported in a wireless communication system to which a method proposed in this specification may be applied.

FIG. 3 shows an example of a resource grid supported in a wireless communication system to which a method proposed in this specification may be applied.

FIG. 3 illustrates that a resource grid is configured with $N_{RB}^\mu N_{sc}^{RB}$ subcarriers on a frequency domain and one subframe is configured with 14·2μ OFDM symbols, but is not limited thereto.

In an NR system, a transmitted signal is described by one or more resource grids configured with $N_{RB}^\mu N_{sc}^{RB}$ subcarriers and OFDM symbols of $2^\mu N_{symb}^{(\mu)}$. In this case, $N_{RB}^\mu \leq N_{RB}^{max,\mu}$. The $N_{RB}^{max,\mu}$ indicates a maximum transmission bandwidth, which may be different between the uplink and the downlink in addition to between numerologies.

Figure 4:
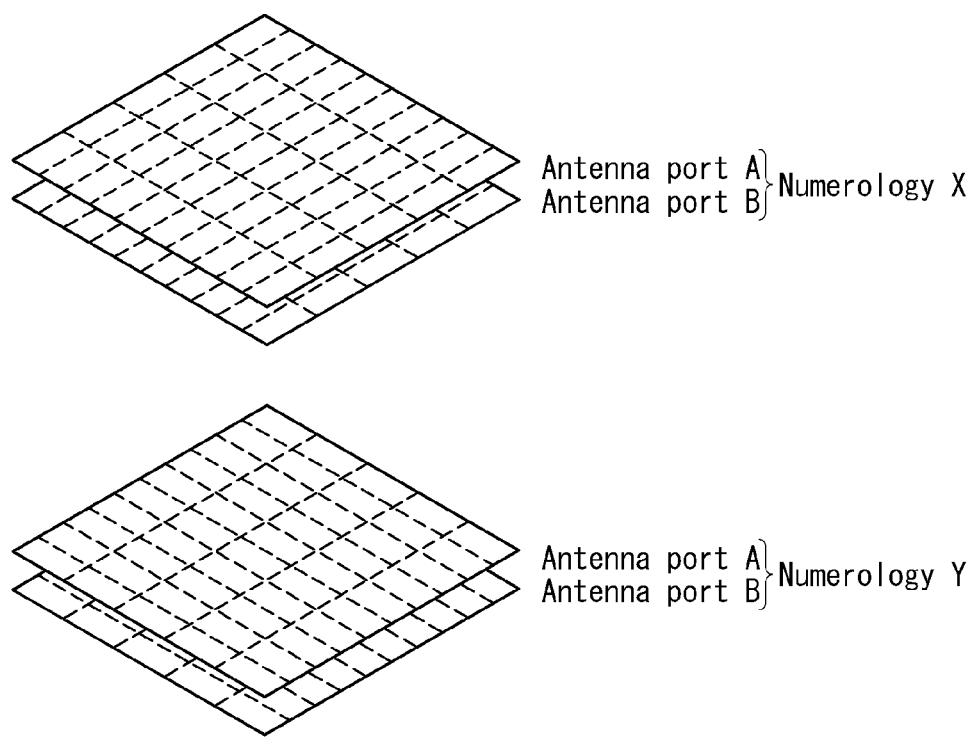
FIG. 4 shows examples of a resource grid for each antenna port and numerology to which a method proposed in this specification may be applied.

In this case, as in FIG. 4, one resource grid may be configured for each numerology and each antenna port p.

FIG. 4 shows examples of a resource grid for each antenna port and numerology to which a method proposed in this specification may be applied.

Each element of the resource grid for a numerology μ and an antenna port p is denoted as a resource element and uniquely identified by an index pair (k,l̄). In this case, $k=0, \ldots, N_{RB}^\mu N_{sc}^{RB}-1$ is an index on a frequency domain, and $\bar{l}=0, \ldots, 2^\mu N_{symb}^{(\mu)}-1$ denotes the position of a symbol within a subframe. When a resource element is denoted in a slot, an index pair (k,l) is used. In this case, $l=0, \ldots, N_{symb}^\mu-1$.

The resource element (k,l̄) for the numerology μ and the antenna port p corresponds to a complex value $a_{k,\bar{l}}^{(p,\mu)}$. If there is no danger of confusion or if a specific antenna port or numerology is not specified, indices μ and may be dropped. As a result, a complex value may be $a_{k,\bar{l}}^{(p)}$ or $a_{k,\bar{l}}$.

Furthermore, a physical resource block is defined as contiguous $N_{sc}^{RB}=12$ subcarriers on a frequency domain. On the frequency domain, physical resource blocks are numbered from 0 to $N_{RB}^{\mu}-1$. In this case, the relation between a physical resource block number $n_{PRB}$ and resource elements (k,l) on the frequency domain is given as in Equation 1.

$$n_{PRB} = \left\lfloor \frac{k}{N_{sc}^{RB}} \right\rfloor \quad \text{[Equation 1]}$$

Furthermore, in relation to a carrier part, a UE may be configured receive or transmit only a subset of a resource grid. In this case, a set of resource blocks configured to be received or transmitted by the UE is numbered from 0 to $N_{URB}^{\mu}-1$ URB on the frequency domain.

Uplink Control Channel

Physical uplink control signaling needs to carry at least hybrid-ARQ acknowledgement, CSI report (including beamforming information, if possible), and a scheduling request.

At least two transmission methods for an uplink control channel supported in an NR system are supported.

An uplink control channel may be transmitted in short duration in the periphery of an uplink symbol(s) transmitted at the last of a slot. In this case, the uplink control channel is time-division-multiplexed and/or frequency-division-multiplexed with an UL data channel within the slot. 1-symbol unit transmission of a slot is supported for an uplink control channel in short duration.

Short uplink control information (UCI) and data are frequency-division-multiplexed in a UE and between UEs if physical resource blocks (PRBs) for short UCI and data do not overlap at least.

In order to support the time division multiplexing (TDM) of short PUCCHs from different UEs within the same slot, a mechanism for notifying a UE of whether a symbol(s) within a slot in which a short PUCCH will be transmitted is supported at least 6 GHz or more is supported.

At least 1) when a reference signal (RS) is multiplexed, UCI and the RS are multiplexed in a given OFDM symbol according to a frequency division multiplexing (FDM) method and 2) a subcarrier spacing between DL/UL data and a PUCCH of short duration in the same slot is the same are supported for 1-symbol duration.

At least, a PUCCH of short duration across 2-symbol duration of a slot is supported. In this case, a subcarrier spacing between DL/UL data and a PUCCH of short duration in the same slot is the same.

At least, a semi-static configuration in which the PUCCH resources of a given UE within a slot, that is, the short PUCCHs of different UEs, can be time-division multiplexed within given duration in the slot is supported.

A PUCCH resource includes a time domain, a frequency domain, and a code domain, if applicable.

A PUCCH of short duration may be extended up to the end of a slot in the UE viewpoint. In this case, after the PUCCH of short duration, an explicit gap symbol is not necessary.

With respect to a slot having a short uplink part (i.e., DL-centric slot), if data is scheduled in the short uplink part, "short UCI" and the data may be frequency-division multiplexed by one UE.

An uplink control channel may be transmitted in long duration over a plurality of uplink symbols in order to improve coverage. In this case, the uplink control channel is frequency-division multiplexed with an uplink data channel within a slot.

UCI carried by a long duration UL control channel may be transmitted in one slot or a plurality of slots, at least, with the design having a low peak to average power ratio (PAPR).

Transmission using a plurality of slots is permitted for total duration (e.g., 1 ms) at least partially.

In the case of a long duration UL control channel, time division multiplexing (TDM) between an RS and UCI is supported for a DFT-S-OFDM.

The long UL part of a slot may be sued for PUCCH transmission of long duration. That is, a PUCCH of long duration is supported for an UL-only slot and all slots having a variable number of symbols configured with a minimum of 4 symbols.

with respect to at least 1- or 2-bit UCI, the UCI may be repeated within N slots (N>1). The N slots may neighbor or may not neighbor in slots in which a PUCCH of long duration is permitted.

At least the simultaneous transmission of a PUSCH and a PUCCH is supported for a long PUCCH. That is, although data is present, uplink control for a PUCCH resource is transmitted. Furthermore, in addition to the PUCCH-PUSCH simultaneous transmission, UCI in a PUSCH is supported.

Intra-TTI slot frequency hopping is supported.

A DFT-s-OFDM waveform is supported.

Transmission antenna diversity is supported.

TDM and FDM between a PUCCH of short duration and a PUCCH of long duration are supported for different UEs in one slot, at least. In a frequency domain, a PRB (or a plurality of PRBs) is a minimum resource unit size for an uplink control channel. If hopping is used, a frequency resource and hopping may not be spread to a carrier bandwidth. Furthermore, a UE-specific RS is used for NR-PUCCH transmission. A set of PUCCH resources is configured by higher layer signaling. The PUCCH resources within the configured set are indicated by downlink control information (DCI).

As part of DCI, timing between data reception and hybrid-ARQ acknowledgement transmission needs to be indicated dynamically (along with at least RRC). A combination of a semi-static configuration and dynamic signaling (for at least some types of UCI information) is used to determine a PUCCH resource for a "long and short PUCCH format." In this case, the PUCCH resource includes a time domain, a frequency domain, and a code domain, if applicable. To use UCI on the PUSCH, that is, to use some of resources for UCI, is supported for the simultaneous transmission of the UCI and data.

Furthermore, at least the uplink transmission of a single HARQ-ACK bit is supported at least. Furthermore, a mechanism that enables frequency diversity is supported. Furthermore, in the case of ultra-reliable and low-latency communication (URLLC), a time interval between scheduling request (SR) resources configured for a UE may be smaller than one slot.

Beam Management

In NR, beam management is defined as follows.

Beam management: a TRP(s) which may be used for DL and UL transmission and reception and/or a set of L1/L2 procedures for obtaining and maintaining a set of UE beams include at least the following contents:

Beam decision: an operation for a TRP(s) or a UE to select its own transmission/Rx beam.

Beam measurement: an operation for a TRP(s) or a UE to measure the characteristics of a received beamforming signal.

Beam reporting: an operation for a UE to report information on a beamformed signal based on beam measurement.

Beam sweeping: an operation of covering a space region using a Tx and/or Rx beam during a time interval according to a pre-determined method.

Furthermore, a Tx/Rx beam correspondence in a TRP and a UE is defined as follows.

A Tx/Rx beam correspondence in a TRP is maintained when at least one of the followings is satisfied.

A TRP may determine a TRP Rx beam for uplink reception based on the downlink measurement of a UE for one or more Tx beams of a TRP.

A TRP may determine a TRP Tx beam for downlink transmission based on the uplink measurement of a TRP for one or more Rx beams of the TRP.

A Tx/Rx beam correspondence in a UE is maintained when at least one of the followings is satisfied.

A UE may determine a UE Tx beam for uplink transmission based on the downlink measurement of a UE for one or more Rx beams of the UE.

A UE may determine a UE Rx beam for downlink reception based on the indication of a TRP based on uplink measurement for one or more Tx beams.

The capability indication of UE beam correspondence-related information is supported for a TRP.

The following DL L1/L2 beam management procedure is supported within one TRP or a plurality of TRPs.

P-1: this is used to enable UE measurement for different TRP Tx beams in order to support the selection of a TRP Tx beam/UE Rx beam(s).

In general, beamforming in a TRP includes intra/inter-TRP Tx beam sweep in different beam sets. For beamforming in a UE, it commonly includes UE Rx beam sweep from a set of different beams.

P-2: UE measurement for different TRP Tx beams is used to change an inter/intra-TRP Tx beam(s).

P-3: if a UE uses beamforming, UE measurement for the same TRP Tx beam is used to change a UE Rx beam.

Aperiodic reporting (aperiodic reporting) triggered by at least a network is supported in P-1-, P-2- and P-3-related operations.

UE measurement based on an RS for beam management (at least a CSI-RS) is configured with K (a total number of beams) beams. A UE reports a measurement result of selected N Tx beams. In this case, N is not an essentially fixed number. A procedure based on an RS for a mobility object is not excluded. Reporting information includes at least a measurement quantity for an N beam(s) and information indicating an N DL Tx beam when N<K. Particularly, a UE may report a CSI-RS resource indicator (CRI) of N' with respect to K'>1 non-zero power (NZP) CSI-RS resources.

A UE may be configured with the following higher layer parameters for beam management.

N≥1 reporting setting, M≥1 resource setting

Links between reporting settings and resource settings are configured in an agreed CSI measurement configuration.

P-1 and P-2 based on a CSI-RS are supported as resource and reporting settings.

P-3 may be supported regardless of whether a reporting setting is present.

Reporting setting including at least the following contents

Information indicating a selected beam

L1 measurement reporting

A time domain operation (e.g., aperiodic operation, a periodic operation, a semi-persistent operation)

Frequency granularity when several frequency granularities are supported

Resource setting including at least the following contents

A time domain operation (e.g., an aperiodic operation, a periodic operation, semi-persistent operation)

RS type: at least an NZP CSI-RS

At least one CSI-RS resource set. Each CSI-RS resource set may include K≥1 CSI-RS resources (some parameters of K CSI-RS resources may be the same. For example, a port number, a time domain operation, density and a period)

Furthermore, NR supports the following beam reporting by taking into consideration an L group where L>1.

Information indicating a minimum group

A measurement quantity for an N1 beam (support L1 RSRP and CSI report (if a CSI-RS is for CSI acquisition))

If applicable, information indicating $N_l$ DL Tx beams

Group-based beam reporting, such as that described above, may be configured in a UE unit. Furthermore, the group-based beam reporting may be turned off in a UE unit (e.g., when L=1 or $N_l$=1).

NR supports that a UE can trigger a mechanism for recovery from a beam failure.

A beam failure event occurs when the quality of a beam pair link of an associated control channel is sufficient low (e.g., a comparison with a threshold and the timeout of an associated timer). The mechanism for recovery from a beam failure (or obstacle) is triggered when a beam obstacle occurs.

A network explicitly configures a resource for transmitting an UL signal with respect to a UE for a recovery object. The configuration of resources is supported at the place where an eNB listens to the resources from all or some of directions (e.g., random access region).

An UL transmission/resource reporting a beam obstacle may be positioned at the same time instance as that of a PRACH (resource orthogonal to a PRACH resource) or at time instance (configurable for a UE) different from that of a PRACH. The transmission of a DL signal is supported so that a UE can monitor a beam in order to identify new potential beams.

NR supports beam management regardless of beam-related indication. If beam-related indication is provided, information on a UE-side beamforming/reception procedure used for CSI-RS-based measurement may be indicated for a UE through QCL. Parameters for delay, Doppler, and an average gain used in the LTE system and a spatial parameter for beamforming in a receiver will be added as a QCL parameter to be supported in NR. The QCL parameter may include a parameter related to an angle of arrival (AOA) in a UE Rx beamforming viewpoint and/or parameters related to an angle of departure (AOD) in an eNB Rx beamforming viewpoint. NR supports that the same or different beams are used for control channel and corresponding data channel transmission.

In the NR, the angle of arrival parameter is collectively referred to as a spatial Rx (receive) parameter. That is, the fact that a specific antenna port is quasi co-located (QCL) with another antenna port in terms of a spatial Rx parameter means that a receiver receiving the two antenna ports may use the same spatial filter. This is the same as informing a UE that the same or similar transmission beam is applied when an eNB transmits the two antenna ports from a downlink perspective.

NR supports the use of the same or different beams in the transmission of a control channel and the corresponding data channel.

For NR-PDCCH transmission supporting the robustness of beam pair link blocking, a UE may be configured to monitor NR-PDCCHs on an M-beam pair link at the same time. In this case, a maximum value of M≥1 and M may depend on at least UE capability.

A UE may be configured to monitor an NR-PDCCH on a different beam pair link(s) in different NR-PDCCH OFDM symbols. A parameter related to UE Rx beam setting for monitoring an NR-PDCCH on a plurality of beam pair links is configured by higher layer signaling or a MAC CE and/or is taken into consideration in the search space design.

At least, NR supports the indication of a spatial QCL assumption between a DL RS antenna port(s) and a DL RS antenna port(s) for the demodulation of a DL control channel. A candidate signaling method for beam indication for an NR-PDCCH (i.e., a configuration method of monitoring an NR-PDCCH) includes MAC CE signaling, RRC signaling, DCI signaling, a spec. transparent and/or implicit method, and a combination of the signaling methods.

For the reception of a unicast DL data channel, NR supports the indication of a spatial QCL assumption between a DL RS antenna port and the DMRS antenna port of a DL data channel.

Information indicating an RS antenna port is indicated through DCI (downlink permission). Furthermore, the information indicates an RS antenna port QCLed with a DMRS antenna port. A different set of DMRS antenna ports for a DL data channel may be indicated as QCL with a different set of RS antenna ports.

Hereinafter, prior to the detailed description of methods proposed in this specification, contents related to the methods proposed in this specification directly/indirectly are first described in brief.

In next-generation communication, such as 5G or New Rat (NR), as more communication devices require a higher communication capacity, there is a need for enhanced mobile broadband communication compared to the existing radio access technology (RAT).

Furthermore, massive machine type communications (MTC) that provides various services anywhere and at any time by connecting a plurality of devices and things is also one of important issues that may be taken into consideration in the next-generation communication.

Furthermore, the design or structure of a communication system in which service and/or a UE sensitive to reliability and latency are taken into consideration is discussed.

As described above, the introduction of the next-generation radio access technology (RAT) in which enhanced mobile broadband (eMBB) communication, massive MTC (mMTC), and ultra-reliable and low latency communication (URLLC) are taken into consideration is being discussed. In this specification, the corresponding technology is generally called "new RAT (NR)", for convenience sake.

OFDM Numerology in NR

A new RAT system uses an OFDM transmission method or a transmission method similar to the method, and has an OFDM numerology of Table 4 representatively.

That is, Table 4 shows an example of OFDM parameters of a New RAT system.

TABLE 4

| Parameter | Value |
| --- | --- |
| Subcarrier-spacing ($\Delta f$) | 60 kHz |
| OFDM symbol length | 16.33 us |
| Cyclic Prefix(CP) length | 1.30 us/ 1.17 us |
| System BW | 80 MHz |
| No. of available subcarriers | 1200 |
| Subframe length | 0.25 ms |
| Number of OFDM symbol per Subframe | 14 symbols |

Analog Beamforming

In a millimeter wave (mmW), multiple antenna elements may be installed in the same area because a wavelength is short.

That is, in a 30 GHz band, a wavelength is 1 cm, and a total of 64 (8×8) antenna elements may be installed in a panel of 4×4 cm at intervals of 0.5 lambda (wavelength) in a 2-dimensional array form.

Therefore, in mmW, coverage is increased or throughput is improved by raising a beamforming (BF) gain using multiple antenna elements.

In this case, if each antenna element has a transceiver unit (TXRU) so that transmission power and a phase can be adjusted, independent beamforming is possible for each frequency resource.

However, there is a problem in that effectiveness is low in terms of the price if TXRUs are installed in all of 100 antenna elements.

Therefore, a method of mapping multiple antenna elements to one TXRU and adjusting the direction of a beam using an analog phase shifter is taken into consideration.

Such an analog beamforming method has a disadvantage in that it cannot perform frequency-optional beamforming because only one beam direction can be formed in a full band.

For this reason, hybrid BF (HBF) having the number of BTXRUs smaller than Q antenna elements in the middle form of digital BF and analog BF may be taken into consideration.

HBF is different depending on a method of connecting B TXRUs and Q antenna elements, but the direction of beams that may be transmitted at the same time is limited to B or less.

Figure 5:
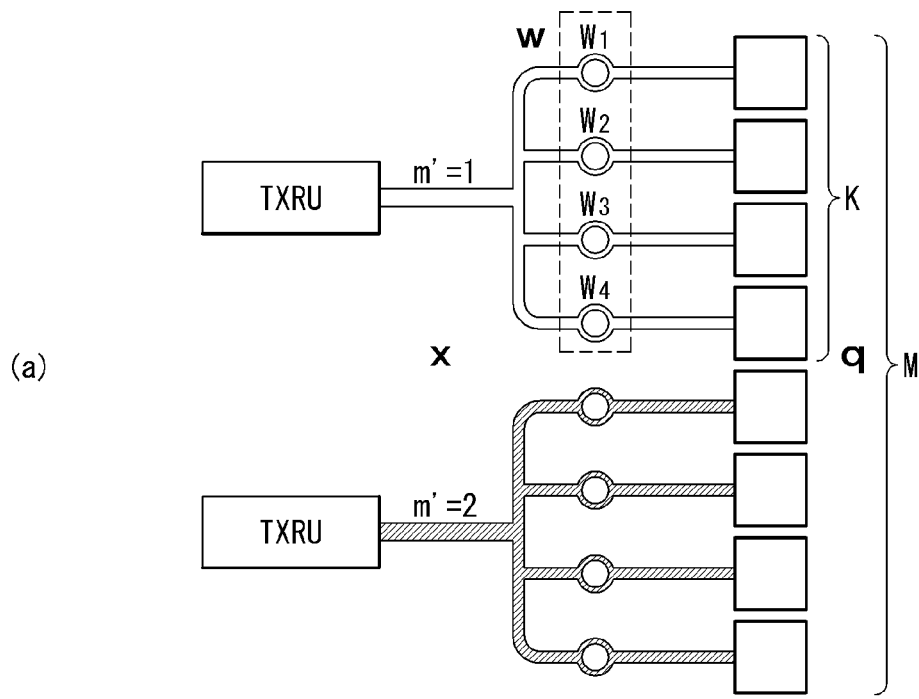
FIG. 5 shows examples of a connection method of a TXRU and an antenna element.
Figure 5:
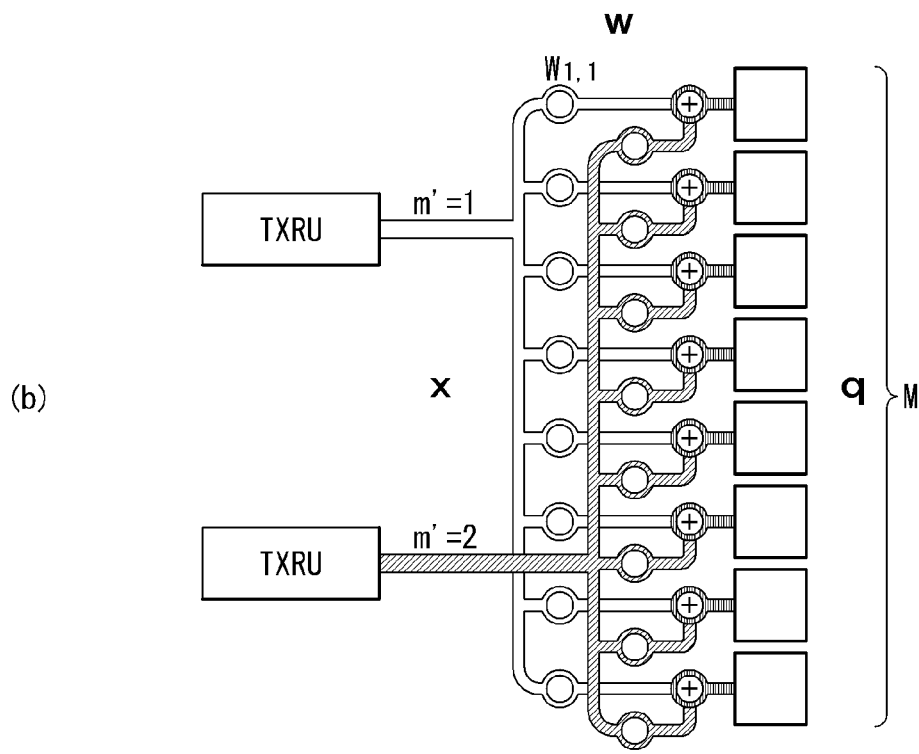

FIG. 5 shows examples of a connection method of a TXRU and an antenna element.

In this case, a TXRU virtualization model shows the relation between the output signal of a TXRU and the output signals of antenna elements.

FIG. 5a shows an example of a method of connecting a TXRU to a sub-array.

Referring to FIG. 5a, an antenna element is connected to only one TXRU. Unlike FIG. 5a, FIG. 5b shows a method of connecting TXRUs to all antenna elements.

That is, in the case of FIG. 5b, the antenna elements are connected to all TXRUs.

In FIG. 5, W indicates a phase vector multiplied by an analog phase shifter.

That is, the direction of analog beamforming is determined by W. In this case, mapping between CSI-RS antenna ports and TXRUs may be 1-to-1 or 1-to-many.

Reference Signal (RS) Virtualization

In mmW, PDSCH transmission is possible in one analog beam direction at one timing by analog beamforming.

Therefore, an eNB transmits data to only some UEs in a specific direction.

Accordingly, data transmission may be performed to a plurality of UEs in several analog beam directions at the same time by differently configuring analog beam directions for each antenna port, if necessary.

Figure 6:
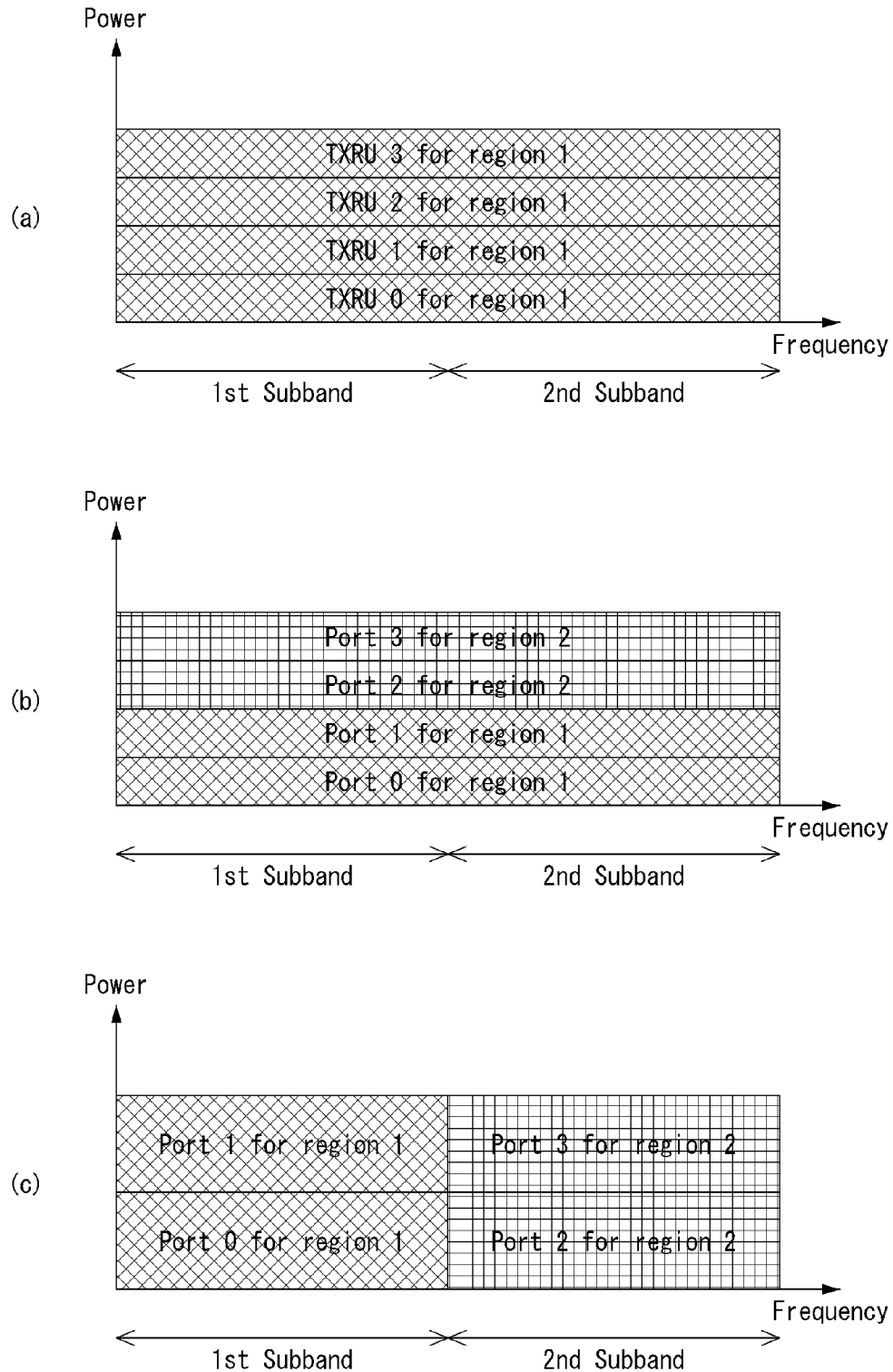
FIG. 6 shows various shows examples of a service area for each TXRU.

FIG. 6 shows various shows examples of a service region for each TXRU.

FIG. 6 shows an example of a structure in which 256 antenna elements are equally divided into four parts to form four sub-arrays and a TXRU is connected to each sub-array.

If each sub-array is configured with a total of 64 (8×8) antenna elements in a 2-dimensional array form, a region corresponding to a horizontal angle region of 15 degrees and a vertical angle region of 15 degrees may be covered by specific analog beamforming.

That is, a region that needs to be served by an eNB is divided into multiple regions, and the regions are served one by one at once.

In the following description, it is assumed that a CSI-RS antenna port and a TXRU are 1-to-1 mapped.

Accordingly, an antenna port and a TXRU may be construed as having the same meaning.

As in FIG. 6a, if all TXRUs (antenna ports, sub-array) have the same analog beamforming direction, the throughput of a corresponding region may be increased by forming a digital beam having higher resolution.

Furthermore, the throughput of a corresponding region may be increased by increasing the rank of transmission data to the corresponding region.

Furthermore, as in FIG. 6b, if each TXRU (antenna port, sub-array) has a different analog beamforming direction, UEs distributed to a wider area can transmit data at the same time in a corresponding subframe (SF).

As shown in FIG. 6b, two of four antenna ports are used by a UE1 in a region 1 for PDSCH transmission, and the remaining two thereof is used by a UE2 in a region 2 for PDSCH transmission.

Furthermore, FIG. 6b shows an example in which a PDSCH 1 transmitted to the UE1 and a PDSCH 2 transmitted to the UE2 has been spatial-division multiplexed (SDM).

In contrast, as in FIG. 6c, the PDSCH 1 transmitted to the UE1 and the PDSCH 2 transmitted to the UE2 may be frequency-division multiplexed (FDM) and transmitted.

From among a method of providing service to one region using all antenna ports and a method of dividing antenna ports and serving several regions at the same time, a preferred method may be different depending on a rank and MCS served to a UE in order to maximize cell throughput.

Furthermore, a preferred method is different depending on the amount of data to be transmitted to each UE.

An eNB calculates a cell throughput or scheduling metric which may be obtained when one region is served using all antenna ports, and calculates a cell throughput or scheduling metric which may be obtained when antenna ports are divided and two regions are served.

An eNB selects the final transmission method by comparing the cell throughputs or scheduling metrics which may be obtained through the two methods.

As a result, the number of antenna ports participating in PDSCH transmission in an SF-by-SF is different.

There is a need for suitable CSI feedback from a UE for an eNB to calculate the transmission MCS of a PDSCH according to the number of antenna ports and to incorporate the CSI feedback into a scheduling algorithm.

CSI Feedback

In the 3GPP LTE (-A) system, it has been defined that a UE reports channel state information (CSI) to a BS.

In this case, the channel state information (CSI) generally refers to information which may indicate the quality of a radio channel (or also called a "link") formed between the UE and an antenna port.

For example, a rank indicator (RI), a precoding matrix indicator (PMI), or a channel quality indicator (CQI) corresponds to the information.

In this case, the RI indicates rank information of a channel. This means the number of streams received by a UE through the same time-frequency resource. The value is determined by long-term fading of a channel, and is fed back from a UE to a BS with a longer period than the PMI or CQI.

The PMI is a value into which channel spatial characteristics have been incorporated, and indicates a precoding index preferred by a UE based on metric, such as an SINR.

The CQI is a value indicating the intensity of a channel. In general, the CQI means a received SINR which may be obtained when a BS uses a PMI.

In the 3GPP LTE (-A) system, a BS may configure multiple CSI processes for a UE, and may receive reporting for CSI for each process.

In this case, the CSI process is configured with a CSI-RS for specifying signal quality from the BS and a CSI-interference measurement (CSI-IM) resource for interference measurement.

Tx-Rx Beam Association

A network may transmit a known signal (e.g., a measurement reference signal (MRS), a beam reference signal (BRS), or a beamformed channel state information reference signal (CSI-RS) to which each beam has been applied in order for a UE to perform measurement on beams to be used in a corresponding cell (or may be used by an eNB), which is hereinafter generally called a "BRS", for convenience of description) aperiodically/periodically.

Furthermore, a UE may select an eNB Tx beam suitable for the UE through the measurement of a BRS.

If up to the Rx beam of a UE is taken into consideration, the UE may perform measurement using different Rx beams, and may select a beam combination(s) by taking into consideration the Tx beam of an eNB and the Rx beam of the UE.

After such a process is performed, the Tx-Rx beam association of the eNB and the UE may be determined explicitly or implicitly.

(1) Network Decision Based Beam Association

A network may indicate that a UE reports a higher XTx-Rx beam combination as a measurement result with respect to the UE. In this case, the number of reported beam combinations may be pre-defined or may be signaled by the network (through high layer signaling) or all of beam combinations in which the measurement result exceeds a specific threshold may be reported.

In this case, the specific threshold may be pre-defined or may be signaled by the network. If each UE has different decoding performance, a category may be defined by taking into consideration the decoding performance of the UE, and a threshold for each category may be defined.

Furthermore, reporting on a beam combination may be performed by the indication of a network periodically and/or aperiodically. Alternatively, if a previous report result and a current measurement result vary by a given level or higher, event-triggered reporting may be performed. In this case, the given level may be pre-defined or may be signaled by a network (through high layer signaling).

A UE may report (one or a plurality of) beam associations determined by the above-described method. If a plurality of beam indices is reported, priority may be assigned to each beam. For example, the beam indices may be reported so that they are interpreted in a form, such as the first ($1^{st}$) preferred beam and the second ($2^{nd}$) preferred beam.

(2) UE Decision Based Beam Association

In the UE decision based beam association, the preferred beam reporting of a UE may be performed using the same method as the above-described explicit beam association.

Rx Beam Assumption for the Measurement

Additionally, the best beam(s) reported by a UE may be a measurement result when one Rx beam is assumed or may be a measurement result when a plurality of Rx beams is assumed. The assumption of an Rx beam may be configured by a network.

For example, if a network has indicated that three measurement results should be reported assuming one Rx beam, a UE may perform measurement using all Rx beams, may select the best (eNB) Tx beam of the measurement results, and may report the $1^{st}$, $2^{nd}$, $3^{rd}$ best results among measurement results according to an Rx beam used for a corresponding Tx beam measurement.

Furthermore, a reported measurement result may be limited to exceed a specific threshold. For example, if a beam having a measurement value (may be pre-defined or set by a network) exceeding a specific threshold, among the $1^{st}$, $2^{nd}$, $3^{rd}$ best beams measured by a UE using a specific Rx beam, is only the 1st best beam, the UE may report only the $1^{st}$ best beam to a BS.

Quasi Co-Location (QCL)

A method of demodulating, by a UE, data (e.g., PDSCH) as a UE-specific RS, such as a specific DMRS, when the UE receives the data is taken into consideration. Such a DMRS is transmitted with respect to only a scheduled RB(s) of a corresponding PDSCH and is transmitted for only a time period in which a scheduled PDSCH is transmitted. Accordingly, there may be a limit to reception performance in performing channel estimation using only a corresponding DMRS itself.

For example, in performing channel estimation, an estimation value of a major large-scale parameter (LSP) of a radio channel is necessary. DMRS density may be insufficient in obtaining the estimation value using only a DMRS present in a time/frequency domain in which a scheduled PDSCH is transmitted.

Accordingly, in order to support such an implementation of a UE, LTE-A supports methods of defining the following quasi co-location signaling/assumption/behaviors between RS ports and configuring/operating a UE based on the quasi co-location signaling/assumption/behavior.

That is, if the large-scale characteristic of a channel in which a symbol on one antenna port is transmitted can be deduced from a channel in which a symbol on a different antenna port is transmitted, the two antenna ports are said to have been quasi co-located (QCL).

In this case, the large-scale characteristic includes one or more of delay spread, Doppler spread, a Doppler shift, an average gain or an average delay.

Furthermore, a UE may assume the antenna ports 0 to 3, and an antenna port for the primary/secondary sync signal of a serving cell has been QCLed with a Doppler shift and average delay.

Physical Downlink Shared Channel (PDSCH) Resource Mapping Parameters

A UE configured with the transmission mode 10 for a given serving cell may be configured up to 4 parameter sets by higher layer signaling in order to decode a PDSCH according to a detected PDCCH/EPDCCH having DCI format 2D intended by the UE and the given serving cell. In order to determine PDSCH RE mapping and if the UE has been configured as a Type B QCL type, the UE will use a parameter configured based on a value of a "PDSCH RE Mapping and Quasi-Co-Location indicator" field in the PDCCH/EPDCCH having the DCI format 2D in order to determine a PDSCH antenna port QCL.

In the case of a PDSCH not having a corresponding PDCCH/EPDCCH, the UE will use a parameter set indicated in a PDCCH/EPDCCH having a DCI format 2D corresponding to associated SPS activation in order to determine the PDSCH RE mapping and the PDSCH antenna port QCL.

Table 5 shows PDSCH RE mapping and Quasi-Co-Location Indicator fields in the DCI format 2D.

TABLE 5

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

The following parameters for determining the PDSCH RE mapping and the PDSCH antenna port QCL are configured through higher layer signaling for each parameter set:
crs-PortsCount-r11
crs-FreqShift-r11
mbsfn-SubframeConfigList-r11
csi-RS-ConfigZPId-r11
pdsch-Start-r11
qcl-CSI-RS-ConfigNZPId-r11
If a UE is configured as a higher layer parameter eMIMO-Type for a TDD serving cell, zeroTxPowerCSI-RS2-r12

Antenna Port QCL for PDSCH

A UE configured as the transmission modes 8-10 of a serving cell may assume that the antenna ports 7-14 of the serving cell are QCL with a given subframe with respect to delay spread, Doppler spread, a Doppler shift, an average gain and average delay.

A UE configured as the transmission modes 1-9 of a serving cell may assume that the antenna ports 0-3, 5, 7-30 of the serving cell are QCL with respect to Doppler shift, Doppler spread, average delay, and delay spread.

A UE configured as the transmission mode 10 of a serving cell is configured as one of 2 QCL types for the serving cell according to a higher layer parameter QCL operation in order to decode a PDSCH using a transmission method related to the antenna ports 7-14:

Type A: a UE may assume that the antenna ports 0-3, 7-30 of a serving cell are QCL with respect to delay spread, Doppler spread, Doppler shift, and average delay.

Type B: a UE may assume that the antenna ports 15-30, corresponding to a CSI-RS resource configuration identified by a higher layer parameter gcl-CSI-RS-ConfigNZPId-r11, and the antenna ports 7-14 associated with a PDSCH are QCL with respect to Doppler shift, Doppler spread, average delay, and delay spread.

In the case of an LAA Scell, a UE does not expect that the LAA Scell will be configured as a QCL type B.

Channel-State Information—Reference Signal (CSI-RS) Definition

With respect to a serving cell and a UE configured as the transmission mode 9 and not configured as a higher layer parameter eMIMO-Type, the UE may be configured as one CSI-RS resource configuration.

With respect to a serving cell and a UE which has been configured as the transmission mode 9 and configured as a higher layer parameter eMIMO-Type and in which eMIMO-Type has been set as "Class A", the UE may be configured as one CSI-RS resource configuration.

With respect to a serving cell and a UE which has been configured as the transmission mode 9 and configured as a higher layer parameter eMIMO-Type and in which eMIMO-Type has been set as "Class B", the UE may be configured as one or more CSI-RS resource configuration.

With respect to a serving cell and a UE configured as the transmission mode 10, the UE may be configured as one or more CSI-RS resource configuration(s). The following parameters whose non-zero transmission power needs to be assumed by a UE with respect to a CSI-RS is configured through higher layer signaling for each CSI-RS resource configuration:

When a UE is configured as the transmission mode 10, a CSI-RS resource configuration identity
The number of CSI-RS ports
CSI RS configuration
CSI RS subframe configuration $I_{CSI-RS}$
If a UE has been configured as the transmission mode 9, a UE assumption for reference PDSCH transmission power $P_c$ for CSI feedback
If a UE has been configured as the transmission mode 10, a UE assumption for reference PDSCH transmission power $P_c$ for CSI feedback with respect to each CSI process
If CSI subframe sets $C_{CSI,0}$ and $C_{CSI,1}$ have been configured as higher layer signaling with respect to one CSI process, $P_c$ is configured with respect to each CSI subframe set of a corresponding CSI process.
Pseudo-random sequence generator parameter $n_{ID}$
If a UE is configured as a higher layer parameter eMIMO-Type and the eMIMO-Type is set as "Class A" with respect to a CSI process, a CDM type parameter.
If a UE has been configured as the transmission mode 10, a UE assumption of a higher layer parameter qcl-CRS-Info-r11CRS for the QCL type B, a CRS antenna port and CSI-RS antenna ports having the following parameters:
qcl-ScramblingIdentity-r11.
crs-PortsCount-r11.
mbsfn-SubframeConfigList-r11.

$P_c$ □ is an assumed ratio of a PDSCH EPRE to a CSI-RS EPRE when a UE derives CSI feedback and takes a value of a [−8, 15] dB range as a 1-dB step size.

In this case, the PDSCH EPRE corresponds to symbols in which the ratio of the PDSCH EPRE and cell a specific RS EPRE is indicated as $\rho_A$.

A UE does not expect a configuration of a CSI-RS and a PMCH in the same subframe of a serving cell.

With respect to a frame structure type 2 serving cell and 4 CRS ports, a UE does not expect that it will receive a CSI-RS configuration index belonging to sets [20-31] for a normal CP case or sets [16-27] for an extended CP case.

A UE may assume that the CSI-RS antenna port of a CSI-RS resource configuration is QCL with respect to delay spread, Doppler spread, Doppler shift, average gain, and average delay.

A UE configured as the transmission mode 10 and the QCL type B may assume that the antenna ports 0 to 3, associated with qcl-CRS-Info-r11 corresponding to a CSI-RS resource configuration, and the antenna ports 15 to 30 corresponding to a CSI-RS resource configuration are QCL with respect to Doppler shift and Doppler spread.

A UE which has been configured as the transmission mode 10 and configured as a higher layer parameter eMIMO-Type and in which eMIMO-Type is set as "Class B" and the number of configured CSI resources is one greater than one CSI process and which has the QCL type B does not expect that it will receive a CSI-RS resource configuration for a CSI process having a different value of a higher layer parameter qcl-CRS-Info-r11.

A BL/CE UE configured as CEModeA or CEModeB does not expect that it will be configured as a non-zero transmission power CSI-RS.

Assumptions Independent of Physical Channel

A UE does not assume that two antenna ports are QCL, unless described otherwise.

A UE may assume that the antenna ports 0 to 3 of a serving cell are QCL with respect to delay spread, Doppler spread, Doppler shift, average gain, and average delay.

For the purpose of discovery signal-based measurement, a UE does not assume the presence of a different signal or physical channel other than a discovery signal.

If a UE supports discoverySignalsInDeactSCell-r12, the UE has been configured as discovery signal-based RRM measurement in a carrier frequency that may be applied to a secondary cell in the same carrier frequency, the secondary cell has been deactivated, and the UE has not been configured by a higher layer in order to receive an MBMS in the secondary cell, an activation command for a PSS, SSS, PBCH, CRS, PCFICH, PDSCH, PDCCH, EPDCCH, PHICH, DMRS and a CSI-RS other than discovery signal transmission is not transmitted by the secondary cell up to a subframe received with respect to the secondary cell.

In the above-described operation, for example, in the case of a UE configured as the QCL Type B, in order to receive help for the channel estimation of a DMRS transmitted along with a scheduled PDSCH, the UE is limited to use LSPs estimated from a specific QCLed CSI-RS resource indicated in corresponding scheduling DCI.

In the new RAT (NR) environment taken into consideration in this specification, however, an aperiodic CSI-RS transmission method in the aspect that a CSI-RS itself is transmitted only when it deviates from a conventional periodic form is taken into consideration. Accordingly, there is a problem in that RS density to be use as a QCL CSI-RS may be sufficiently insufficient compared to a conventional technology.

QCL Parameter

At least one of the followings may be defined/configured as QCL parameters taken into consideration in the NR environment:

Delay spread
Doppler spread
Doppler shift
Average gain
Average delay
Average angle (AA)

This may mean that, for example, an Rx beam direction (and/or Rx beam width/sweeping degree) when a transmission signal from other antenna port(s) is received based on an AA estimated from a specific antenna port(s) is configured to be the same or similar (in association with this) and reception processing is possible (meaning that reception performance when an operation is performed as described above is guaranteed to be a specific level or more) between antenna ports whose QCL is guaranteed in the AA viewpoint.

The AA may also be represented as a name, such as an "(almost) dominant arrival angle", for example.

As a result, if a specific dominant (arrival) angle S of a signal measured from a specific antenna port is present, a specific dominant (arrival) angle of a signal measured from another antenna port capable of QCL assumption with the specific dominant (arrival) angle S may have a meaning that it is "almost" similar to the S.

That is, if such a QCL assumption is possible, this means that a receiver can use/apply an AA, estimated from a specific indicated QCLed RS/SS, to reception processing "almost" without any change. Accordingly, there is an advantage in that the efficient implementation/operation of a receiver are made possible.

Angular spread (AS):

QCL in an AS aspect between two antenna ports means that an AS estimated from one port may be derived or estimated or applied from an AS estimated from another port.

In this case, the AS may be separately defined for each specific dimension as an azimuth and/or a zenith AS or may be defined together. Furthermore, in the departure and/or arrival aspect, the AS may be defined separately or together.

This may mean that, for example, an Rx beam width/sweeping degree (and/or Rx beam direction) when a transmission signal from other antenna port(s) is received based on an AS estimated from a specific antenna port(s) is configured to be the same or similar (in association with this) and reception processing is possible (meaning that reception performance when an operation is performed as described above is guaranteed to be a specific level or more) between antenna ports whose QCL is guaranteed in the AS viewpoint.

That is, if the AA has a characteristic meaning an average and the (most) effective/dominant beam direction, the AS may be interpreted as a parameter regarding that how much is the beam direction spread and received by a radiator distribution (based on/with reference to the AA).

Power Angle (-of-Arrival) Profile (PAP):

A QCL in the PAP viewpoint between two antenna ports may mean that a PAP estimated from one port may be derived (or estimated or applied, which are identically handled) from a PAP estimated from the other port. In this case, the PAPs may be defined for each specific dimension may be defined together as a PAP for an Azimuth and/or Zenith angle-domain. Furthermore, the PAPs may be defined separately or together in the departure and/or arrival viewpoint.

This may mean that a received beam width/sweeping degree (and/or a received beam direction) when a transmission signal from another antenna port(s) is to be received based on a PAP estimated from a specific antenna port(s) can be configured to be the same or similar (in association with this) and reception processing is possible (meaning that reception performance when an operation is performed as described above is guaranteed to be a specific level or more) between antenna ports whose QCL is guaranteed in the PAP viewpoint.

Partial QCL

A partial QCL may also be called a sub-QCL, fractional QCL, or quasi-sub-location (QSL).

For example, to assume (or configure or indicate) that the partial QCL of a signal and/or channel, transmitted by a specific antenna port group A, for a signal and or channel transmitted by a specific antenna port group B is established may mean that a corresponding QCL parameter and/or QCL property for an antenna port group A may be assumed (or applied or used) to be a sub-set of a corresponding QCL parameter and/or QCL property estimated from an antenna port group B.

In a new RAT (NR) system, an eNB (i.e., a cell or a transmission and reception point (TRP)) and a UE have a plurality of antenna elements and may form a transmission-reception beam (Tx-Rx beam) through analog beamforming. In this case, the UE may transmit and receive data to and from a plurality of eNBs (simultaneously or sequentially) using a plurality of beams. For example, the UE may transmit and receive data by forming (or configuring) different Tx-Rx beam pairs (Tx-Rx beam pairs) with a plurality of eNBs. Hereinafter, in this specification, a Tx-Rx beam pair is called a beam pair, for convenience of description.

Figure 7:
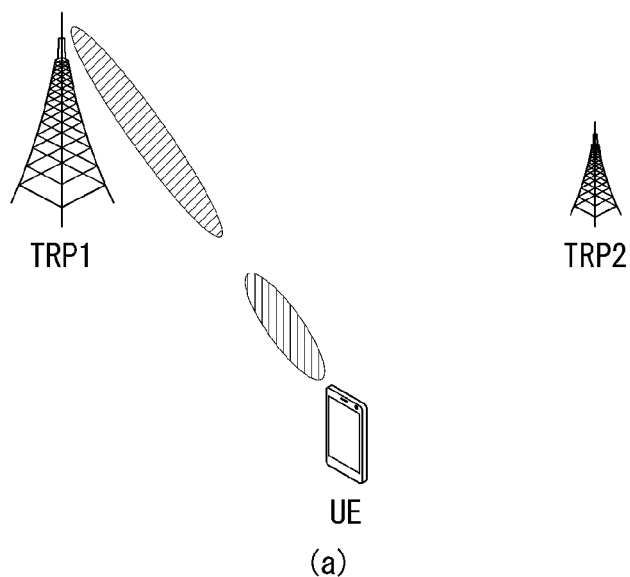
FIG. 7 illustrates examples of a beam pair configuration for transmitting and receiving data between a UE and eNBs to which a method proposed in this specification may be applied.
Figure 7:
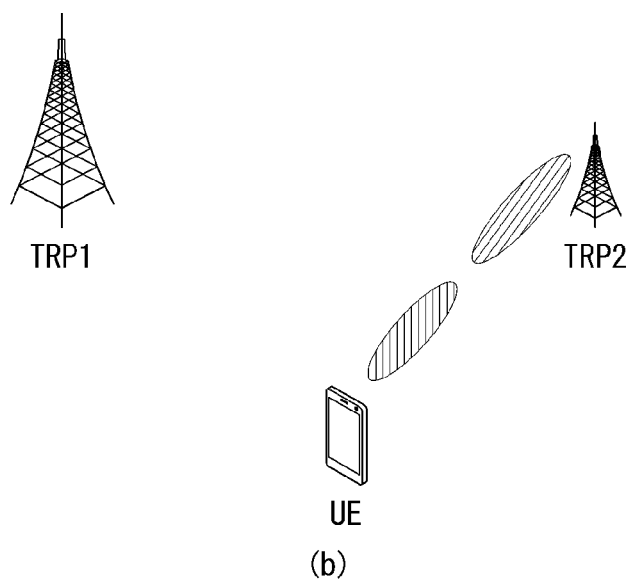

FIG. 7 illustrates examples of a beam pair configuration for transmitting and receiving data between a UE and eNBs to which a method proposed in this specification may be applied. FIG. 7 is merely for convenience of description and does not limit the scope of the present disclosure.

FIG. 7(a) illustrates a case where a user equipment (UE) forms a first beam pair with a first eNB (i.e., TRP 1) and transmits an uplink signal (or channel or data) (i.e., first uplink transmission (UL Transmission 1)). In contrast, FIG. 7(b) illustrates a case where a UE forms a second beam pair with a second eNB (i.e., TRP 2) and transmits an uplink signal (i.e., second uplink transmission (UL Transmission 2)).

As shown in FIG. 7, the UE may transmit the uplink signals to the first eNB and the second eNB using the different beam pairs (i.e., different paths). This is not limited to the first eNB and the second eNB, but may also be expanded and applied to a case where a UE performs uplink transmission with a plurality of eNBs.

If a UE performs uplink transmission on eNBs using different beam pairs, a plurality of timing advances (TAs) for the different beam pairs may be necessary. That is, if path differences between a UE and eNBs are configured to be great, a plurality of TAs (i.e., a plurality of TA offset values) for compensating for the path difference may be necessary.

In this case, the UE may transmit an uplink signal by applying a proper TA value (or TA process) to each eNB. In this case, what the UE transmits the uplink signal by applying the TA value (or TA process) may mean that the UE configures (or determines) uplink transmission timing (i.e., uplink subframe) by incorporating a TA offset corresponding to the TA value (or TA process) and transmits the uplink signal or channel based on the set uplink transmission timing.

In this specification, a method of configuring and indicating, by an eNB, a plurality of TA processes in the environment in which a UE can transmit and receive data to and from a plurality of eNBs (e.g., FIG. 7), and a UE operation and eNB operation related to the method are described below.

The existing LTE system (i.e., legacy LTE system) supports both an open loop (OL) method (i.e., OL TA process) and a closed loop (CL) method (i.e., CL TA process) in relation to a TA process as in a power control process.

In this case, the OL TA process may mean a method of measuring, by a UE, a timing error using a reference RS (e.g., CRS or CSI-RS), adjusting a subframe boundary, and adjusting (or configuring) uplink transmission timing based on them. In contrast, the CL TA process may mean a method of receiving, by an eNB, an uplink reference signal (uplink RS) (e.g., sounding reference signal (SRS)) from a UE and directly transmitting a TA offset and/or a TA command to the UE through a medium access control-control element (MAC-CE).

Hereinafter, a method of configuring and indicating a plurality of TA processes by considering the OL TA process and/or the CL TA process if a plurality of TA processes is necessary (i.e., a plurality of TA values is necessary) is described through various embodiments.

Furthermore, the following embodiments have been divided for convenience of description only, and some elements or characteristics of any embodiment may be included in another embodiment or may be substituted with corresponding some elements or characteristics of another embodiment. For example, a method described in the following second embodiment may be additionally applied to a method described in the first embodiment and vice versa.

FIRST EMBODIMENT

Method Reference RS (RRS)

First, a method of configuring and indicating a plurality of TA processes using a reference RS (RRS) may be taken into consideration. Hereinafter, the corresponding method is illustrated as being applied to an OL TA process, for convenience of description, but may be identically applied to a CL TA process.

Specifically, an eNB may configure an RRS(s) for a plurality of OL TA processes through higher layer signaling. That is, the eNB may transmit, to a UE, configuration information for an RRS pre-defined (or pre-configured) for each of the plurality of OL TA processes through higher layer signaling. In this case, the higher layer signaling may include an RRC message or an MAC-CE.

The RRS(s) may include a synchronization signal block (SS block) and/or a periodic or semi-persistence CSI-RS. In this case, the synchronization signal block may include at least one of a primary SS (PSS), a secondary SS (SSS), or a physical broadcast channel (PBCH). In this case, an SS block index may be represented as a cell ID indicator or an SS block index of a corresponding cell. Furthermore, the CSI-RS may include a CSI-RS configured for beam management (i.e., use for beam management).

In this case, what the eNB configures a specific pre-defined (or pre-configured) RRS for each OL TA process may mean that (the eNB) indicates (or configures) a corresponding OL TA process for a specific Tx-Rx beam direction (e.g., beam pair link or the beam pair). For example, the eNB may configure an RRS for each OL TA process. Specifically, a first OL TA process (OL TA process #1) may be mapped (or may correspond) to a first SS block index (SS block index #1). A second OL TA process (OL TA process #2) may be mapped to a fourth SS block index (SS block index #4). A third OL TA process (OL TA process #3) may be mapped to a second CSI-RS resource ID (CSI-RS resource ID #2).

Furthermore, the RRS(s) for the plurality of OL TA processes may be changed or modified through higher layer signaling (e.g., RRC message or MAC-CE) by considering a Tx-Rx beam update and/or a serving beam update.

Furthermore, if an RRS(s) for an OL TA process(s) is separately not indicated (or configured), a UE may recognize (or identify, determine or decide) a synchronization signal block and/or periodic/semi-persistence CSI-RS (for beam management), having the greatest received signal power (e.g., RSRP, RSRQ) as an RRS. Alternatively, in this case, the UE may recognize the most recently indicated synchronization signal block and/or periodic/semi-persistence CSI-RS as an RRS. Alternatively, in this case, the UE may recognize a synchronization signal block and/or a periodic/semi-persistence CSI-RS, corresponding to a serving beam(s) (e.g., beam pair link), as an RRS. An OL TA process using such a method may be called a default OL TA process.

Furthermore, the method, that is, the method using an RRS(s) for a plurality of OL TA processes may also be applied to a case where an RRS(s) for a plurality of power control processes is used (or configured or indicated). For example, as in the method, an RRS(s) for a plurality of power control processes may include a synchronization signal block and/or a periodic/semi-persistence CSI-RS. Furthermore, an eNB may transmit (or indicate or configure) configuration information for an RRS(s) to a UE through higher layer signaling.

SECOND EMBODIMENT

Method Using SRS Resource

Unlike in the above description, a method of configuring and/or indicating a plurality of TA processes using an SRS resource may also be taken into consideration. Hereinafter, the corresponding method is illustrated as being applied to a CL TA process for convenience of description, but may also be identically applied to an OL TA process.

Specifically, an eNB may configure (and/or indicate) a CL TA process for each SRS resource through higher layer signaling. In this case, the eNB may transmit configuration information for the SRS resource to a UE through higher layer signaling. That is, the SRS resource configuration may be performed through higher layer signaling, and a CL TA process may be additionally configured (or mapped) for each SRS resource ID. In this case, the higher layer signaling may include an RRC message or an MAC-CE.

For example, an eNB may configure SRS support for each CL TA process. Specifically, a first CL TA process (CL TA process #1) may be mapped (or may correspond) to a first SRS resource ID (SRS resource ID #1), a second CL TA process (CL TA process #2) may be mapped to a second SRS resource ID (SRS resource ID #2), and a third CL TA process (CL TA process #3) may be mapped to a third SRS resource ID (SRS resource ID #3).

Furthermore, an eNB may additionally configure specific information for each SRS resource by considering a coordinated multi-point operation (CoMP operation). For example, the eNB may additionally configure (and/or indicate) a virtual cell identifier (VOID) and/or a power control process in addition to the TA process for each SRS resource.

Furthermore, an eNB may configure (and/or indicate) the same CL TA process for each SRS resource. That is, the eNB does not configure a CL TA process by mapping one SRS resource to one CL TA process, but may configure a CL TA process by mapping one or more SRS resources to one CL TA process. For example, an eNB may configure (or associate) a CL TA process for each specific group related to an SRS resource. That is, the eNB may configure (or associate) an SRS resource group-based CL TA process. In this case, a specific group related to an SRS resource may be an SRS resource group, a beam group of the SRS resource, or a BS group (or cell/TRP group (cell/TRP group)) of the SRS resource.

Furthermore, if a different beam is used for each port (i.e., antenna port) of a corresponding SRS resource, a method of configuring or indicating a CL TA process for each port of an SRS resource in addition to an SRS resource may be taken into consideration.

Furthermore, in the NR system, a method of differently defining an SRS resource type depending on the use (or purpose) of an SRS is taken into consideration. For example, a Type A SRS resource for UL CSI acquisition, a Type B SRS resource for UL beam management, and a Type C SRS resource for DL CSI acquisition may be taken into consideration. In this case, the Type C SRS resource may be taken into consideration if reciprocity between a DL channel and an UL channel is established. In relation to this, as in the following examples, an eNB may differently configure (or indicate) a CL TA process for each SRS resource type.

For example, SRS resources allocated for UL beam management (i.e., for UL beam management use) in the same TRP (i.e., for the same TRP) may be configured as the same CL TA process. In this case, all the SRS resources configured (or allocated) for beam management may be configured to correspond to a pre-configured default CL TA process (e.g., the CL TA process of a primary cell/TRP) or the same CL TA process (satisfying a specific condition).

For another example, an eNB may configure and/or indicate a CL TA process depending on a UE capability. For example, the eNB may configure (or associate or assume) the same CL TA process for SRS resources allocated for the same UE panel (i.e., the antenna panel of a UE).

Furthermore, the CL TA process configuration for each SRS resource, the CL TA process configuration based on an SRS resource group, the CL TA process configuration for each port of an SRS resource and/or the CL TA process configuration for each SRS resource type may be changed or modified through higher layer signaling (e.g., RRC message or MAC-CE). For example, the configuration may be updated through higher layer signaling by considering a Tx-Rx beam update and/or a serving beam update.

Furthermore, as in the first embodiment, if a separate CL TA process(es) is not configured (or indicated) for each SRS resource, a UE may assume a default CL TA process. In this case, the default CL TA process may be the CL TA process of a primary cell/TRP or the most recently configured (or indicated) CL TA process.

Furthermore, a method of configuring (or indicating), by an eNB, an RRS for an OL TA for each SRS resource and measuring (or configuring) reference timing using the configured RRS by expanding and applying the first embodiment may also be taken into consideration.

Furthermore, an information element for a CL TA process may be configured, and an SRS resource ID may be configured (or indicated) for each CL TA process ID.

Furthermore, an RRS and an SRS resource ID may be configured at the same time for each TA process. For example, a first SS block index (SS block index #1) (for an RRS of an OL TA process) and a second SRS resource ID (SRS resource ID #2) (for a CL TA process) may be configured in accordance with a first TA process (TA process #1).

If a plurality of TA processes is configured or indicated based on an SRS resource as described above, operations of an eNB and a UE for uplink transmission (i.e., the transmission of an uplink signal and/or a channel) are described specifically below.

If a multi-eNB (i.e., cell/TRP (multi-cell/TRP)) system (or environment) (e.g., dynamic point selection) is taken into consideration, a UE may infer an TA value interlocked with (or associated with or corresponding to) an SRS resource indicated by control information for uplink signal (e.g., PUSCH) transmission to different eNBs, and may transmit the uplink signal by applying the inferred TA value. For example, if a multi-cell system is taken into consideration, a UE may infer a TA value operating in conjunction with an SRS resource indicated in the SRS resource indicator (SRI) field of an UL grant for PUSCH transmission, and may transmit UL data at set uplink transmission timing by applying the inferred TA value.

Figure 8:
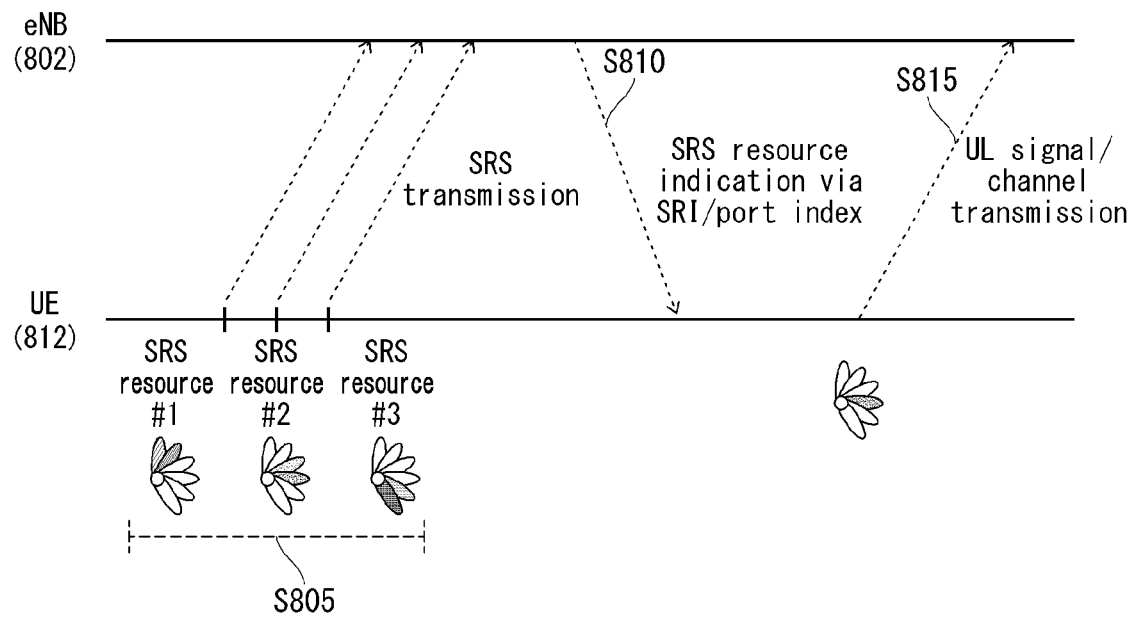
FIG. 8 illustrates an example of a method of performing uplink transmission using a TA process configuration based on an SRS resource to which a method proposed in this specification may be applied.

FIG. 8 illustrates an example of a method of performing uplink transmission using a TA process configuration based on an SRS resource to which a method proposed in this specification may be applied. FIG. 8 is merely for convenience of description and does not limit the scope of the present disclosure.

Referring to FIG. 8, a case where an eNB 802 and a UE 812 operate in a multi-cell system (i.e., a multi-cell/TRP environment) and a plurality of TA processes related to a plurality of beam pairs is configured based on an SRS resource (or for each SRS resource) through the above-described method is assumed.

In this case, the eNB 802 may forward (or transmit), to the UE, configuration information for a plurality of TA processes (e.g., TA process configuration information), pre-configured for each SRS resource, through higher layer signaling. In this case, the configuration information may include configuration information (or information element) indicative of an SRS resource ID configured for each TA process.

At step S805, the UE 812 may perform SRS transmission using an SRS resources (i.e., first SRS resource (SRS resource #1), a second SRS resource (SRS resource #2), a third SRS resource (SRS resource #3) allocated by the eNB 802. In this case, the UE may perform the SRS transmission using all the SRS resources allocated by the eNB or may perform the SRS transmission using only some of the allocated SRS resources.

In this case, the SRS resources may mean SRS resources allocated to transmit SRSs using different beam directions (i.e., beam pair link). That is, the different SRS resources may mean different beam directions used for SRS transmission. Furthermore, in this case, the UE 812 may perform the SRS transmission by applying TA values set for the respective SRS resources.

Thereafter, at step S810, the eNB 802 may indicate a specific SRS resource using an SRS resource indicator (SRI) and/or a port index (i.e., the port index of an SRS resource). In relation to this, in the NR system, a method of performing, by an eNB, an indication for a specific SRS resource selected from pre-transmitted (or previously transmitted) SRS resources through the SRI field of an UL grant may be taken into consideration. For example, when the eNB 802 indicates a specific SRI (i.e., specific SRS resource) through the SRI field of the UL grant, this may indicate that the UE should perform multi-cell/TRP transmission or transmit uplink data in different beam (or precoder) direction. In this case, the eNB may select a specific SRS resource from SRS resources through which an SRS has been received from the UE or SRS resources allocated to the UE.

Thereafter, at step S815, the UE 812 may transmit an uplink signal and/or channel based on the indication (i.e., indication for SRS resource (SRS resource indication)) of the eNB 802. For example, the UE 812 may infer a TA value associated with (or corresponding to or related to) an SRS resource indicated by the eNB 802, and may transmit the uplink signal and/or channel (e.g., uplink data) by applying the inferred TA value. In other words, the UE 812 may identify the TA process mapped in accordance with the specific SRS resource indicated by the eNB 802, may configure (or adjust) uplink transmission timing (i.e., uplink subframe boundary) by applying a TA offset value of the identified TA process, and may transmit the uplink signal and/or channel at the set uplink transmission timing.

Furthermore, in this case, the UE 812 may transmit the uplink signal and/or channel (e.g., uplink data) by additionally applying a VOID and/or power control process operating in conjunction with a corresponding SRS resource (i.e., specific SRS resource indicated by the eNB).

Furthermore, in relation to step S810, the eNB 802 may indicate a plurality of SRIs and/or port indices not a specific SRI or a specific port index. In other words, the eNB may indicate a plurality of SRS resources for the UE. In this case, the UE may transmit the uplink signal and/or channel by applying the same TA value to the plurality of SRS resources or applying a different TA value corresponding to each SRS resource.

In relation to the case where the same TA value is applied to a plurality of indicated SRS resources, the UE 812 may set a maximum TA value of corresponding SRS resources as a TA value for the SRS resources, and may perform uplink transmission. Alternatively, the UE 812 may calculate an average of the TA values of corresponding SRS resources, may set the calculated average TA value as a TA value for the SRS resources, and may perform uplink transmission. In this case, the uplink signal can be reached at the highest probability within a cyclic prefix (CP) interval using an average of TA values optimized for each eNB (i.e., cell/TRP). Alternatively, the UE may set a TA value to which a weighted average based on a specific function pre-defined (or pre-configured) for corresponding SRS resources has been applied as a TA value for the SRS resources, and may perform uplink transmission.

Furthermore, in various embodiments of the present disclosure, an eNB may transmit, to a UE, an uplink beam indication related to beam information for uplink transmission through separate signaling (e.g., higher layer signaling or DL control information (DCI)) regardless of the SRI field of the UL grant. In this case, the UE may infer beam information for SRS transmission and a TA value operating in conjunction with (or corresponding to) a corresponding SRS resource through a corresponding uplink beam indication.

Figure 9:
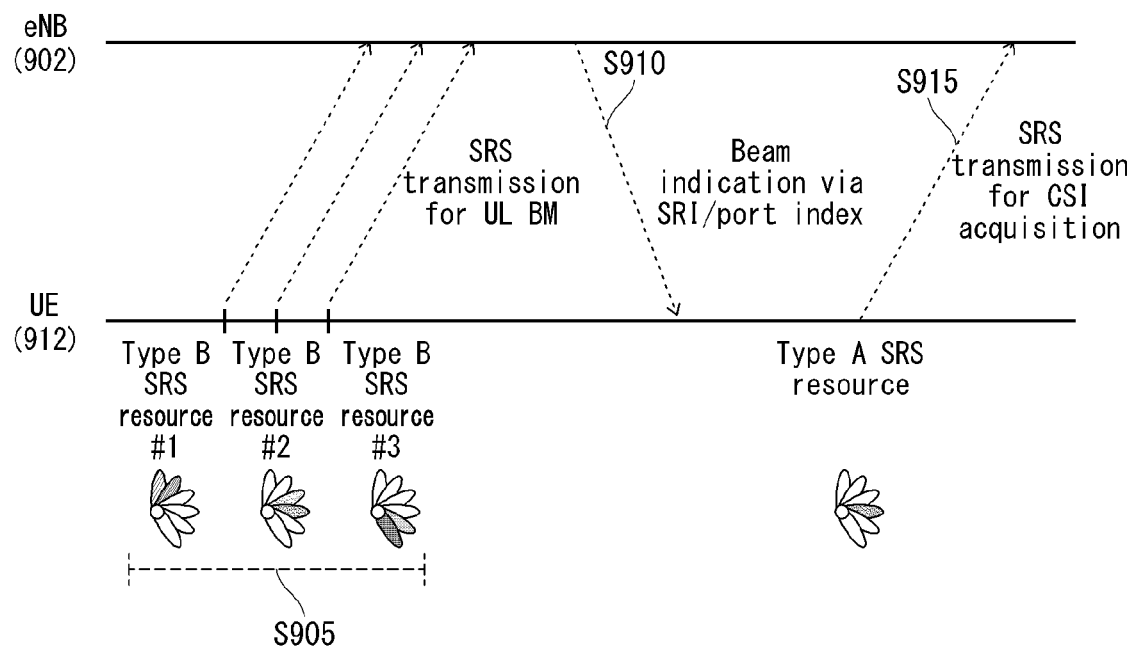
FIG. 9 illustrates an example of an uplink beam management method through SRS transmission to which a method described in this specification may be applied.

FIG. 9 illustrates an example of an uplink beam management method through SRS transmission to which a method described in this specification may be applied. FIG. 9 is merely for convenience of description and does not limit the scope of the present disclosure.

Referring to FIG. 9, a case where an eNB 902 performs uplink beam management through a Type B SRS resource configured for beam management is assumed. In this case, the eNB 902 may indicate uplink beam information, selected through the uplink beam management, with respect to a UE 912 using an SRS resource indicator (SRI) and/or a port index (i.e., the port index of an SRS resource). In this case, detailed operations of the eNB 902 and the UE 912 are as follows.

At step S905, the UE 912 may perform SRS transmission using Type B SRS resources (i.e., a first Type B SRS resource (Type B SRS resource #1), a second Type B SRS resource (Type B SRS resource #2), and a third Type B SRS resource (Type B SRS resource #3)). In this case, the SRS resources may be divided depending on a beam direction (i.e., beam pair link) used for the SRS transmission. In this case, the eNB 902 may perform an uplink beam management procedure using SRSs transmitted through the Type B SRS resources.

Thereafter, at step S910, the eNB 902 may indicate a beam indication indicative of the selected uplink beam information with respect to the UE 912 as an SRI and/or a port index. In this case, the selected uplink beam information may mean information on an uplink beam, selected by the eNB 902, through an uplink beam management procedure performed using the SRSs transmitted at step S905.

Configuration information (or indication information) for such a beam indication may be configured or indicated through signaling (e.g., MAC-CE or DCI) different from information (or information element) of the SRI field of the UL grant. Furthermore, if a TA modification for a corresponding SRS resource is necessary, the eNB may perform configuration or indication, including a TA offset and/or a TA command, through higher layer signaling. That is, if a TA change or modification for a corresponding SRS resource (e.g., SRS resource related to the selected uplink beam information) is necessary, the eNB 902 may additionally configure or indicate a TA offset and/or a TA command through higher layer signaling (e.g., MAC-CE). A configuration (or indication) for the TA offset and/or the TA command may be performed simultaneously with or separately from a configuration (or indication) for configuration information for the beam indication.

Thereafter, at step S915, the UE 912 may perform uplink transmission using the uplink beam indicated by the eNB 902. For example, the UE 912 may perform SRS transmission for CSI acquisition using a Type A SRS resource indicated by the eNB. In this case, the UE 912 may perform the uplink transmission by modifying the TA value into a TA offset or TA command value for a corresponding SRS resource included in the beam indication of the eNB and/or inferring a TA value operating in conjunction with a corresponding SRS resource.

In this case, if reciprocity or beam correspondence between a DL channel and an UL channel is established, the eNB may indicate the uplink beam information with respect to the UE using a specific DL reference signal (e.g., CSI-RS resource indicator (CRI) and/or port index (i.e., the port index of a CSI-RS resource)). In this case, the UE may consider that the indication indicates a Type A SRS resource for CSI acquisition as the reciprocal uplink beam of a DL beam. Furthermore, the UE does not infer a separate CL TA process, and may infer a default OL TA process or may recognize the indication as only a Tx beam indication for only SRS transmission.

Furthermore, in the above-described embodiments, the method of transmitting an SRS and/or a PUSCH (i.e., uplink data) using a (CL) TA process operating in conjunction with (or corresponding to) an indicated (or configured) SRS resource has been described. However, the above method may also be applied to PUCCH (i.e., uplink control information) transmission in different eNBs (i.e., cell/TRP) in addition to SRS or PUSCH transmission.

For example, in the NR system, a UE may transmit a PUCCH through a different transmission beam and/or Rx beam (i.e., beam pair) based on a PUCCH type (e.g., short PUCCH or long PUCCH) and/or a time pattern. In this case, an eNB may previously configure or indicate a beam indication for PUCCH transmission through an SRS resource indicator (SRI). In this case, the UE may perform PUCCH transmission using a (CL) TA process operating in conjunction with a corresponding SRS resource (i.e., SRS resource indicated by the eNB).

Furthermore, in the above-described embodiments, the (OL) TA process method based on an RRS configuration (or indication) and the (CL) TA process method based on SRS transmission (i.e., SRS resource) have been described by considering a plurality of Tx-Rx beams or beam pair links. In relation to this, an eNB may additionally (or separately) indicate (or configure) configuration information for an association (or combination) between the OL TA process and the CL TA process by considering a Tx-Rx beam or beam pair link (between UEs). For example, the eNB may first adjust an approximate TA value using the CL TA process method, and may configure (or indicate or design) the OL TA process method so that it is used for the fine adjustment of the TA value. Through such a method, there is an effect in that the complexity and overhead of TA value adjustment by a UE can be reduced.

In this case, the eNB may transmit, to the UE, information for such a configuration through higher layer signaling (e.g., RRC message or MAC-CE). The corresponding UE may set (or adjust) uplink transmission timing using the CL TA process method and/or the OL TA process method based on the configuration, and may perform uplink transmission at set uplink transmission timing.

Figure 10:
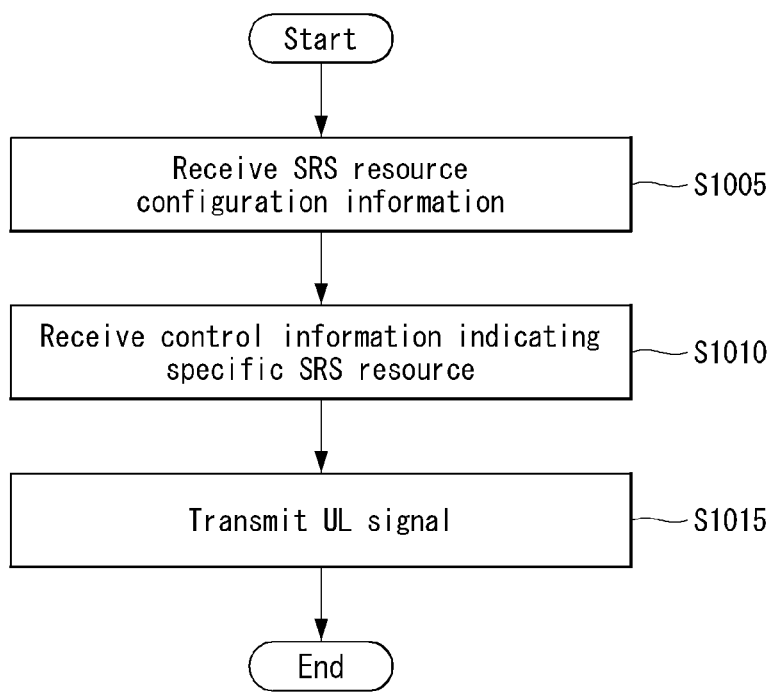
FIG. 10 illustrates an operational flowchart of a UE performing uplink transmission by configuring a timing advance to which a method proposed in this specification may be applied.

FIG. 10 illustrates an operational flowchart of a UE performing uplink transmission by configuring a timing advance to which a method proposed in this specification may be applied. FIG. 10 is merely for convenience of description and does not limit the scope of the present disclosure.

Referring to FIG. 10, a system that transmits and receives signals through one or more beams, that is, a case where the UE transmits and receives signals to and from one or more eNBs (i.e., cell/TRPs) using one or more beam pairs, is assumed.

At step S1005, the UE receives, from an eNB, SRS resource configuration information for the transmission of a sounding reference signal (SRS). In this case, the SRS resource configuration information includes configuration information indicative of at least one timing advance value (TA value) preset for one or more SRS resources. In this case, the SRS resource configuration information may mean configuration information related to the SRS resource in the above-described embodiments. In this case, the UE may receive the SRS resource configuration information through higher layer signaling (e.g., RRC message or MAC-CE).

In this case, the SRS resource configuration information includes one or more identifiers (i.e., the above-described SRS resource IDs) indicative of the one or more SRS resources. The preset at least one TA value may be set using the one or more identifiers. The contents that the TA value is set based on an SRS resource ID are the same as those described above.

For example, if the one or more SRS resources are grouped into a plurality of SRS resource groups, a TA value may be differently set for each SRS resource group. For another example, if the beams of the one or more SRS resources are grouped into a plurality of beam groups, a TA value may be differently set for each beam group. For another example, if the cells of the one or more SRS resources are grouped into a plurality of cell groups, a TA value may be differently set for each cell group.

Furthermore, as described above, the SRS resource configuration information may further include configuration information indicative of at least one virtual cell identifier (VOID) or power control (i.e., power control process) pre-configured for the one or more SRS resources.

Thereafter, at step S1010, the UE may receive, from the eNB, control information indicative of a specific SRS resource of the one or more SRS resources. That is, the UE may receive an indication for a specific SRS resource of SRS resources allocated by the eNB. In this case, if the UE attempts to transmit a PUSCH using a beam resource corresponding to the specific SRS resource, the control information may be received through the SRS resource indicator field (SRI field) of an UL grant. Through the control information, the eNB may indicate uplink signal transmission to a plurality of cells/TRPs or different beam (or precoder) directions with respect to the UE.

Thereafter, at step S1015, the UE transmits an uplink signal (e.g., PUSCH or uplink data) at set uplink transmission timing (i.e., uplink subframe) using a TA value corresponding to the specific SRS resource. A method of setting, by a UE, uplink transmission timing using a TA value is the same as that described above.

In this case, if the UE receives, from the eNB, control information indicative of a plurality of SRS resources of the one or more SRS resources, the UE may transmit the uplink signal at the set uplink transmission timing using a maximum value of TA values corresponding to the plurality of SRS resources. Alternatively, in this case, the UE may transmit the uplink signal at the set uplink transmission timing using an average value of TA values corresponding to the plurality of SRS resources.

Furthermore, in various embodiments of the present disclosure, an SRS resource configured for a TA process (i.e., TA value) (i.e., the method according to the second embodiment) and a reference signal (i.e., RRS) configured for a TA process (i.e., the method according to the first embodiment) may be combined and used.

Specifically, the UE may receive configuration information indicative of one or more TA values preset for one or more reference signals in addition to the SRS resource configuration information. In this case, if the UE receives a specific reference signal of the plurality of reference signals, the UE may transmit the uplink signal at the set uplink transmission timing using a first TA value corresponding to the specific SRS resource and a second TA value corresponding to the specific reference signal. In this case, the one or more reference signals may include at least one of the synchronization signal block or CSI-RS described in the first embodiment.

General Apparatus to which the Present Disclosure May be Applied

Figure 11:
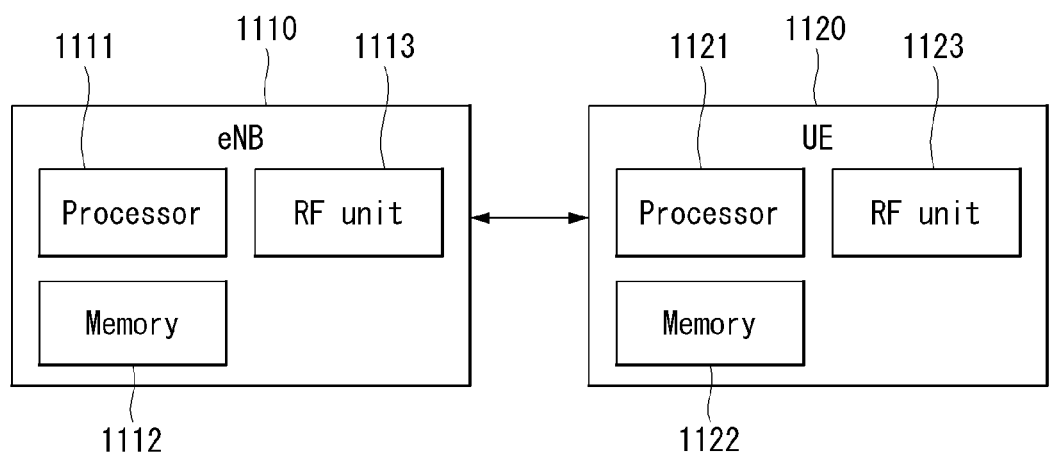
FIG. 11 illustrates a block diagram of a wireless communication apparatus according to an embodiment of the present disclosure.

FIG. 11 illustrates a block diagram of a wireless communication device according to an embodiment of the present disclosure.

Referring to FIG. 11, a wireless communication system includes an eNB (or network) 1110 and a UE 1120.

The eNB 1110 includes a processor 1111, a memory 1112, and a communication module 1113.

The processor 1111 implements the functions, processes and/or methods proposed in FIGS. 1 to 10. The layers of a wired/wireless interface protocol may be implemented by the processor 1111. The memory 1112 is connected to the processor 1111 and stores various types of information for driving the processor 1111. The communication module 1113 is connected to the processor 1111 and transmits and/or receives wired/wireless signals.

The communication module 1113 may include a radio frequency (RF) unit for transmitting and receiving radio signals.

The UE 1120 includes a processor 1121, a memory 1122, and a communication module (or the RF unit) 1123. The processor 1121 implements the functions, processes and/or methods proposed in FIGS. 1 to 10. The layers of a radio interface protocol may be implemented by the processor 1121. The memory 1122 is connected to the processor 1121 and stores various types of information for driving the processor 1121. The communication module 1123 is connected to the processor 1121 and transmits and/or receives a radio signal.

The memory 1112, 1122 may be positioned inside or outside the processor 1111, 1121 and may be connected to the processor 1111, 1121 by various well-known means.

Furthermore, the eNB 1110 and/or the UE 1120 may have a single antenna or multiple antennas.

Figure 12:
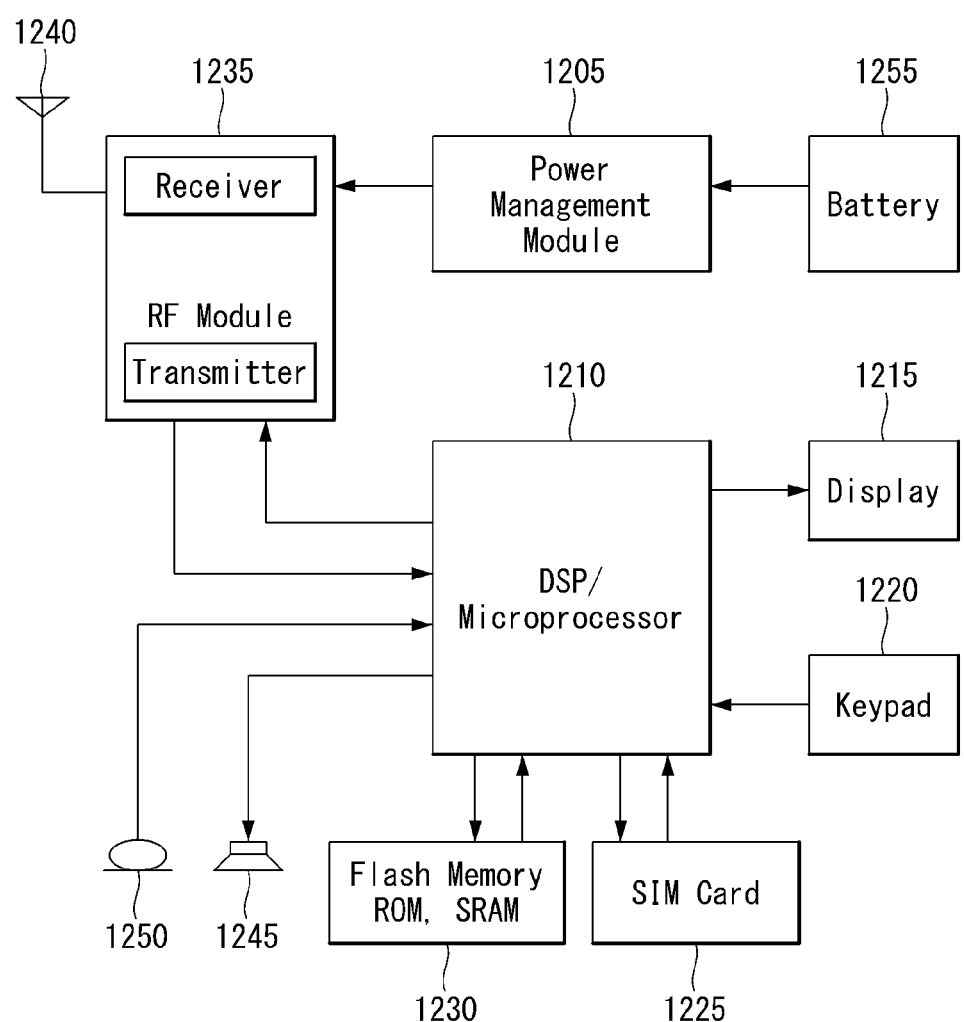
FIG. 12 illustrates a block diagram of a communication apparatus according to an embodiment of the present disclosure.

FIG. 12 illustrates a block diagram of a communication device according to an embodiment of the present disclosure.

Particularly, FIG. 12 is a diagram illustrating the UE of FIG. 11 more specifically.

Referring to FIG. 12, the UE may include a processor (or digital signal processor (DSP)) 1210, an RF module (or RF unit) 1235, a power management module 1205, an antenna 1240, a battery 1255, a display 1215, a keypad 1220, a memory 1230, a subscriber identification module (SIM) card 1225 (this element is optional), a speaker 1245, and a microphone 1250. The UE may further include a single antenna or multiple antennas.

The processor 1210 implements the function, process and/or method proposed in FIGS. 1 to 10. The layers of a radio interface protocol may be implemented by the processor 1210.

The memory 1230 is connected to the processor 1210, and stores information related to the operation of the processor 1210. The memory 1230 may be positioned inside or outside the processor 1210 and may be connected to the processor 1210 by various well-known means.

A user inputs command information, such as a telephone number, by pressing (or touching) a button of the keypad 1220 or through voice activation using the microphone 1250, for example. The processor 1210 receives such command information and performs processing so that a proper function, such as making a phone call to the telephone number, is performed. Operational data may be extracted from the SIM card 1225 or the memory 1230. Furthermore, the processor 1210 may recognize and display command information or driving information on the display 1215, for convenience sake.

The RF module 1235 is connected to the processor 1210 and transmits and/or receives RF signals. The processor 1410 delivers command information to the RF module 1235 so that the RF module 1235 transmits a radio signal that forms voice communication data, for example, in order to initiate communication. The RF module 1235 includes a receiver and a transmitter in order to receive and transmit radio signals. The antenna 1240 functions to transmit and receive radio signals. When a radio signal is received, the RF module 1235 delivers the radio signal so that it is processed by the processor 1210, and may convert the signal into a baseband. The processed signal may be converted into audible or readable information output through the speaker 1245.

The aforementioned embodiments have been achieved by combining the elements and characteristics of the present disclosure in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present disclosure. Order of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative, but should be construed as being illustrative from all aspects. The scope of the present disclosure should be determined by reasonable analysis of the attached claims, and all changes within the equivalent range of the present disclosure are included in the scope of the present disclosure.

INDUSTRIAL APPLICABILITY

The signal transmission and reception methods using a beam in a wireless communication system of the present disclosure have been illustrated based on an example in which it is applied to the 3GPP LTE/LTE-A system and 5G, but may be applied to various wireless communication systems in addition to the 3GPP LTE/LTE-A system and 5G.

The invention claimed is:

1. A method of transmitting and receiving, by a user equipment, a signal through one or more beams in a wireless communication system, the method comprising:
   receiving, from a base station, sounding reference signal (SRS) resource configuration information for a transmission of an SRS, wherein the SRS resource configuration information comprises configuration information indicating at least one preset timing advance value for one or more SRS resources;
   receiving, from the base station, control information indicating a specific SRS resource of the one or more SRS resources; and
   transmitting a physical uplink shared channel (PUSCH) through the one or more beams at an uplink transmission timing configured using a timing advance value corresponding to the specific SRS resource,
   wherein the SRS resource configuration information includes information representing a reference signal configured for each of one or more SRS resources,
   wherein a timing error is measured based on the reference signal related to the specific SRS resource,
   wherein the uplink transmission timing is determined based on the measured timing error and the timing advance value corresponding to the specific SRS resource,
   wherein the at least one preset timing advance value is configured based on i) a usage configured for each of the one or more SRS resources and ii) a panel of the user equipment configured for each of the one or more SRS resources,
   wherein SRS resources of the one or more SRS resources based on a same panel among panels of the user equipment are related to a same timing advance value, and
   wherein SRS resources of the one or more SRS resources based on a same usage are related to a default timing advance value.

2. The method of claim 1,
   wherein the SRS resource configuration information comprises one or more identifiers indicating the one or more SRS resources, and
   wherein the at least one preset timing advance value is set using the one or more identifiers.

3. The method of claim 2, wherein if the one or more SRS resources are grouped into a plurality of SRS resource groups, the timing advance value is differently set for each SRS resource group.

4. The method of claim 2, wherein if beams of the one or more SRS resources are grouped into a plurality of beam groups, the timing advance value is differently set for each beam group.

5. The method of claim 2, wherein if cells of the one or more SRS resources are grouped into a plurality of cell groups, the timing advance value is differently set for each cell group.

6. The method of claim 1, wherein the control information is received through an SRS resource indicator field of an uplink grant.

7. The method of claim 2, wherein the SRS resource configuration information further comprises configuration information indicating at least one virtual cell identifier or power control pre-configured for the one or more SRS resources.

8. The method of claim 1, further comprising:
   if the user equipment receives, from the base station, control information indicating a plurality of SRS resources of the one or more SRS resources, transmitting the PUSCH at an uplink transmission timing configured using a maximum value of timing advance values corresponding to the plurality of SRS resources.

9. The method of claim 1, further comprising:
   if the user equipment receives, from the base station, control information indicating a plurality of SRS resources of the one or more SRS resources, transmitting the PUSCH at an uplink transmission timing configured using an average value of timing advance values corresponding to the plurality of SRS resources.

10. The method of claim 2, wherein the SRS resource configuration information is received through higher layer signaling.

11. The method of claim 1, wherein the reference signal comprises at least one of a synchronization signal block or a channel state information-reference signal (CSI-RS).

12. A user equipment transmitting and receiving a signal through one or more beams in a wireless communication system, the user equipment comprising:
   a radio frequency (RF) module for transmitting and receiving a radio signal; and
   a processor functionally coupled to the RF module,
   wherein the processor is configured to:
   receive, from a base station, sounding reference signal (SRS) resource configuration information for a transmission of an SRS, wherein the SRS resource configuration information comprises configuration information indicating at least one preset timing advance value for one or more SRS resources;
   receive, from the base station, control information indicating a specific SRS resource of the one or more SRS resources; and
   transmit a physical uplink shared channel (PUSCH) through the one or more beams at an uplink transmission timing configured using a timing advance value corresponding to the specific SRS resource,
   wherein the SRS resource configuration information includes information representing a reference signal configured for each of one or more SRS resources,
   wherein a timing error is measured based on the reference signal related to the specific SRS resource,
   wherein the uplink transmission timing is determined based on the measured timing error and the timing advance value corresponding to the specific SRS resource,
   wherein the at least one preset timing advance value is configured based on i) a usage configured for each of the one or more SRS resources and ii) a panel of the user equipment configured for each of the one or more SRS resources,
   wherein SRS resources of the one or more SRS resources based on a same panel among panels of the user equipment are related to a same timing advance value, and wherein SRS resources of the one or more SRS resources based on a same usage are related to a default timing advance value.

13. The user equipment of claim 12,
wherein the SRS resource configuration information comprises one or more identifiers indicating the one or more SRS resources, and
wherein the at least one preset timing advance value is set using the one or more identifiers.

* * * * *